(12) United States Patent
Shoshan-Barmatz

(10) Patent No.: US 12,544,421 B2
(45) Date of Patent: Feb. 10, 2026

(54) VDAC INHIBITORS FOR TREATING INFLAMMATORY BOWEL DISEASES

(71) Applicant: THE NATIONAL INSTITUTE FOR BIOTECHNOLOGY IN THE NEGEV LTD., Beer-Sheva (IL)

(72) Inventor: Varda Shoshan-Barmatz, Omer (IL)

(73) Assignee: THE NATIONAL INSTITUTE FOR BIOTECHNOLOGY IN THE NEGEV LTD., Beer-Sheva (IL)

(*) Notice: Subject to any disclaimer, the term of this patent is extended or adjusted under 35 U.S.C. 154(b) by 1204 days.

(21) Appl. No.: 17/297,046

(22) PCT Filed: Nov. 26, 2019

(86) PCT No.: PCT/IL2019/051291
§ 371 (c)(1),
(2) Date: May 26, 2021

(87) PCT Pub. No.: WO2020/110112
PCT Pub. Date: Jun. 4, 2020

(65) Prior Publication Data
US 2022/0023382 A1    Jan. 27, 2022

Related U.S. Application Data

(60) Provisional application No. 62/771,213, filed on Nov. 26, 2018.

(51) Int. Cl.
| | |
|---|---|
| *A61K 38/17* | (2006.01) |
| *A61K 31/438* | (2006.01) |
| *A61K 31/4468* | (2006.01) |
| *A61K 31/454* | (2006.01) |
| *A61K 31/496* | (2006.01) |
| *A61P 37/06* | (2006.01) |

(52) U.S. Cl.
CPC ........ *A61K 38/1709* (2013.01); *A61K 31/438* (2013.01); *A61K 31/4468* (2013.01); *A61K 31/454* (2013.01); *A61K 31/496* (2013.01); *A61P 37/06* (2018.01)

(58) Field of Classification Search
CPC ................................................ A61K 38/1709
USPC .................................................. 514/252.12
See application file for complete search history.

(56) References Cited

U.S. PATENT DOCUMENTS

| | | |
|---|---|---|
| 2005/0234116 A1 | 10/2005 | Sugiyama et al. |
| 2018/0078548 A1 | 3/2018 | Shoshan-Barmatz et al. |
| 2018/0118700 A1 | 5/2018 | Shoshan-Barmatz |

FOREIGN PATENT DOCUMENTS

| | | |
|---|---|---|
| WO | 2003075923 A1 | 9/2003 |
| WO | 2015011711 A1 | 1/2015 |
| WO | 2017046794 A1 | 3/2017 |
| WO | 2017081686 A1 | 5/2017 |
| WO | 2018116307 A1 | 6/2018 |

OTHER PUBLICATIONS

Chassaing B, Aitken JD, Malleshappa M, Vijay-Kumar M. Dextran sulfate sodium (DSS)-induced colitis in mice. Curr Protoc Immunol. Feb. 4, 2014;104:15.25.1-15.25.14. doi: 10.1002/0471142735. im1525s104. PMID: 24510619; PMCID: PMC3980572.
Nguyen TL, Vieira-Silva S, Liston A, Raes J. How informative is the mouse for human gut microbiota research? Dis Model Mech. Jan. 2015;8(1):1-16. doi: 10.1242/dmm.017400. PMID: 25561744; PMCID: PMC4283646.
Poritz LS, Garver KI, Green C, Fitzpatrick L, Ruggiero F, Koltun WA. Loss of the tight junction protein ZO-1 in dextran sulfate sodium induced colitis. J Surg Res. Jun. 1, 2007;140(1):12-9. doi: 10.1016/j.jss.2006.07.050. Epub Apr. 6, 2007. PMID: 17418867.
Yan Y, Kolachala V, Dalmasso G, Nguyen H, Laroui H, Sitaraman SV, Merlin D. Temporal and spatial analysis of clinical and molecular parameters in dextran sodium sulfate induced colitis. PLoS One. Jun. 29, 2009;4(6):e6073. doi: 10.1371/journal.pone.0006073. PMID: 19562033; PMCID: PMC2698136.
Kim, J., Gupta, R., Blanco, L. P., Yang, S., Shteinfer-Kuzmine, A., Wang, K. et al. (2019). VDAC oligomers form mitochondrial pores to release mtDNA fragments and promote lupus-like disease. Science, 366(6472), 1531-1536.
Ben-Hail, D., Begas-Shvartz, R., Shalev, M., Shteinfer-Kuzmine, A., Gruzman, A., Reina, S., & Shoshan-Barmatz, V. (2016). Novel compounds targeting the mitochondrial protein VDAC1 inhibit apoptosis and protect against mitochondrial dysfunction. Journal of Biological Chemistry, 291(48), 24986-25003. DOI:https://doi.org/10.1074/jbc.M116.744284.
Boyapati RK, Dorward DA, Tamborska A, Kalla R, Ventham NT, Doherty MK, Whitfield PD, Gray M, Loane J, Rossi AG, Satsangi J, Ho GT. Mitochondrial DNA Is a Pro-Inflammatory Damage-Associated Molecular Pattern Released During Active IBD. Inflamm Bowel Dis. Sep. 15, 2018;24(10):2113-2122. doi: 10.1093/ibd/izy095. PMID: 29718255; PMCID: PMC7301773.
Bär F, Bochmann W, Widok A, von Medem K, Pagel R, Hirose M, Yu X, Kalies K, Konig P, Böhm R, Herdegen T, Reinicke AT, Büning J, Lehnert H, Fellermann K, Ibrahim S, Sina C. Mitochondrial gene polymorphisms that protect mice from colitis. Gastroenterology. Nov. 2013; 145(5):1055-1063.e3. doi: 10.1053/j.gastro.2013. 07.015. Epub Jul. 19, 2013. PMID: 23872498.
Weinberg SE, Sena LA, Chandel NS. Mitochondria in the regulation of innate and adaptive immunity. Immunity. Mar. 17, 2015;42(3):406-17. doi: 10.1016/j.immuni.2015.02.002. PMID: 25786173; PMCID: PMC4365295.
Xu X, Duan S, Yi F, Ocampo A, Liu GH, Izpisua Belmonte JC. Mitochondrial regulation in pluripotent stem cells. Cell Metab. Sep. 3, 2013;18(3):325-32. doi: 10.1016/j.cmet.2013.06.005. Epub Jul. 11, 2013. PMID: 23850316.

(Continued)

*Primary Examiner* — Taofiq A Solola
(74) *Attorney, Agent, or Firm* — The Roy Gross Law Firm, LLC; Roy D. Gross

(57) ABSTRACT

The present invention relates to methods for treating inflammatory bowel disease (IBD). Particularly, the present invention relates to use of specific inhibitors of Voltage-Dependent Anion Channel (VDAC1), such as piperazine- and/or piperidine-derivatives, among others, e.g., peptides and oligonucleotides, for treating IBD.

7 Claims, 12 Drawing Sheets

Specification includes a Sequence Listing.

(56) References Cited

OTHER PUBLICATIONS

Chen L, Zhou Z, Yang Y, Chen N, Xiang H (2017) Therapeutic effect of imiquimod on dextran sulfate sodium-induced ulcerative colitis in mice. PLoS ONE 12(10): e0186138. https://doi.org/10.1371/journal.pone.0186138.
Van Meeteren ME, Meijssen MA, Zijlstra FJ. The effect of dexamethasone treatment on murine colitis. Scand J Gastroenterol. May 2000;35(5):517-21. doi: 10.1080/003655200750023787. PMID: 10868455.
Shoshan-Barmatz, V., Krelin, Y., & Shteinfer-Kuzmine, A. (2018). VDAC1 functions in Ca2+ homeostasis and cell life and death in health and disease. Cell Calcium, 69, 81-100. https://doi.org/10.1016/j.ceca.2017.06.007.
PCT International Search Report for International Application No. PCT/2019/051291, mailed Feb. 17, 2020, 4pp.
PCT Written Opinion for International Application No. PCT/2019/051291, mailed Feb. 17, 2020, 7pp.
PCT International Preliminary Report on Patenability for International Application No. PCT/2019/051291, issued May 25, 2021, 8pp.

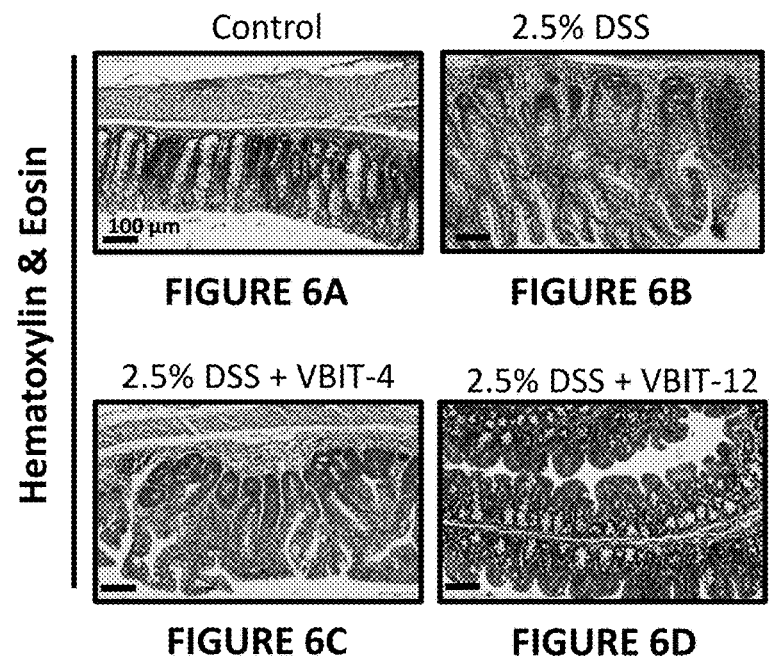
FIGURE 6A Control — Hematoxylin & Eosin
FIGURE 6B 2.5% DSS
FIGURE 6C 2.5% DSS + VBIT-4
FIGURE 6D 2.5% DSS + VBIT-12
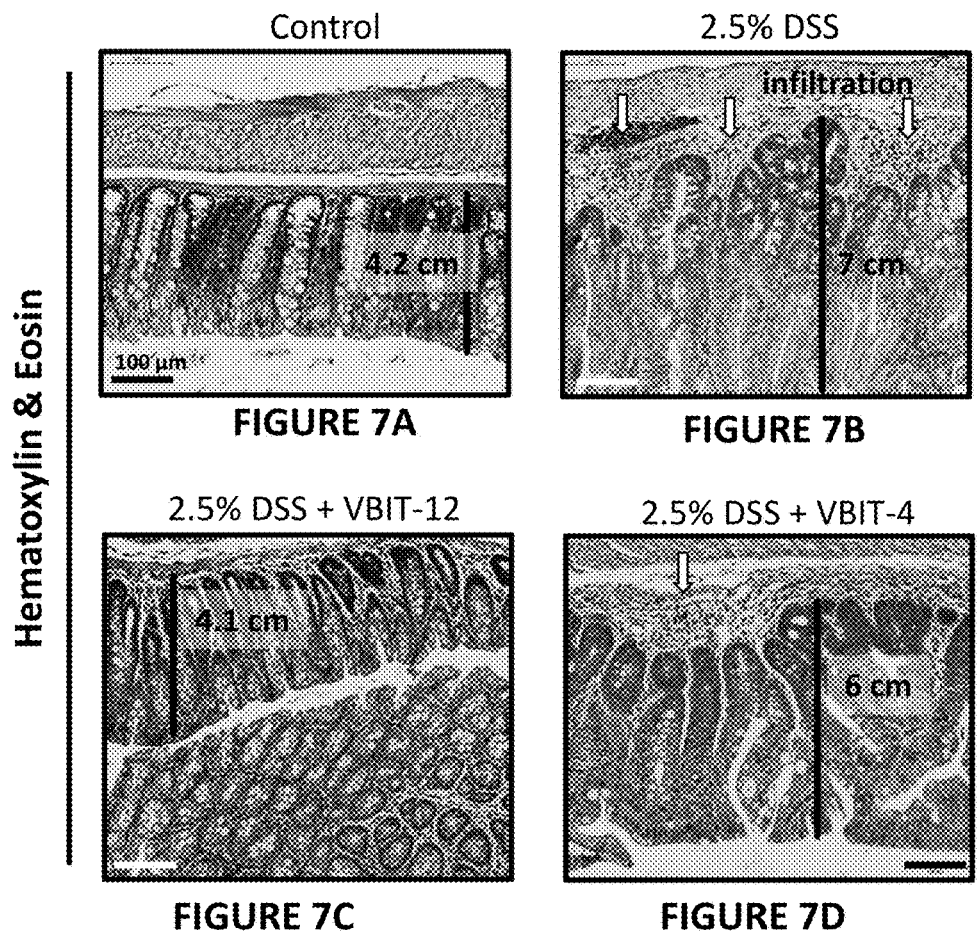
FIGURE 7A Control
FIGURE 7B 2.5% DSS
FIGURE 7C 2.5% DSS + VBIT-12
FIGURE 7D 2.5% DSS + VBIT-4

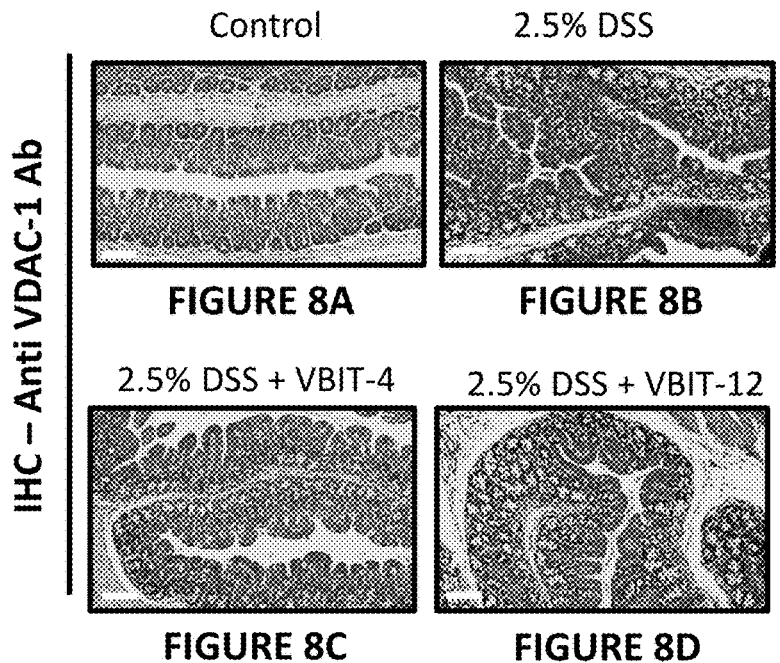
FIGURE 8A FIGURE 8B FIGURE 8C FIGURE 8D
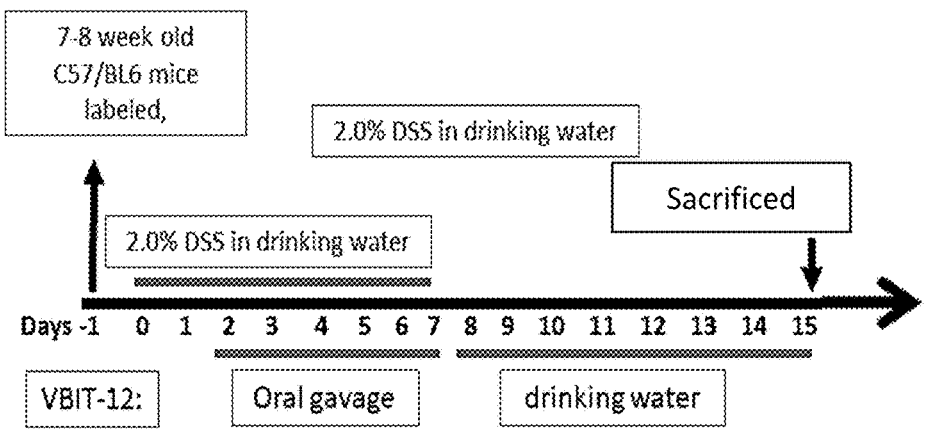
FIGURE 9A
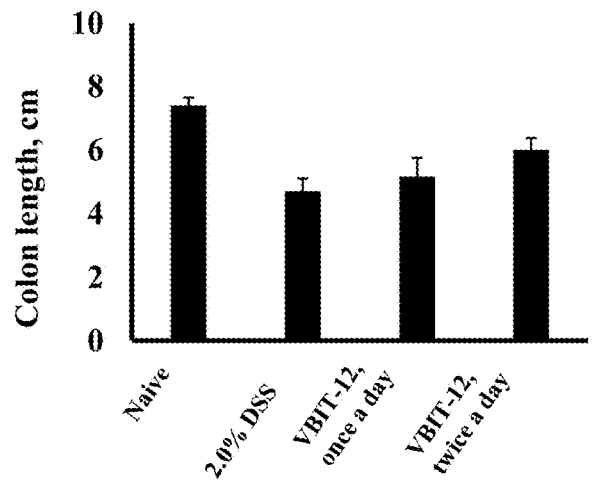
FIGURE 9B

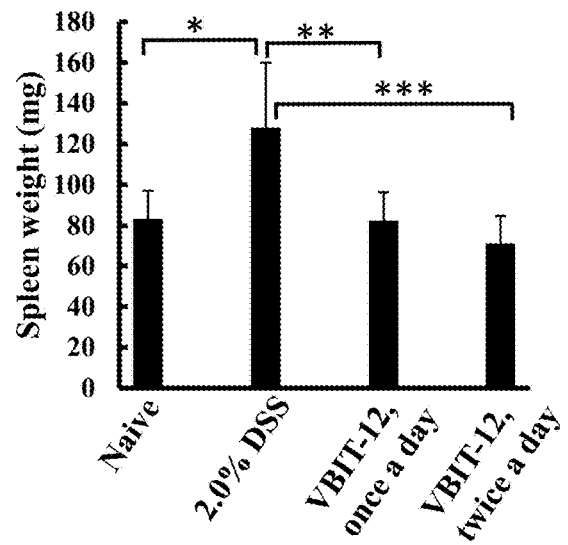
FIGURE 9C
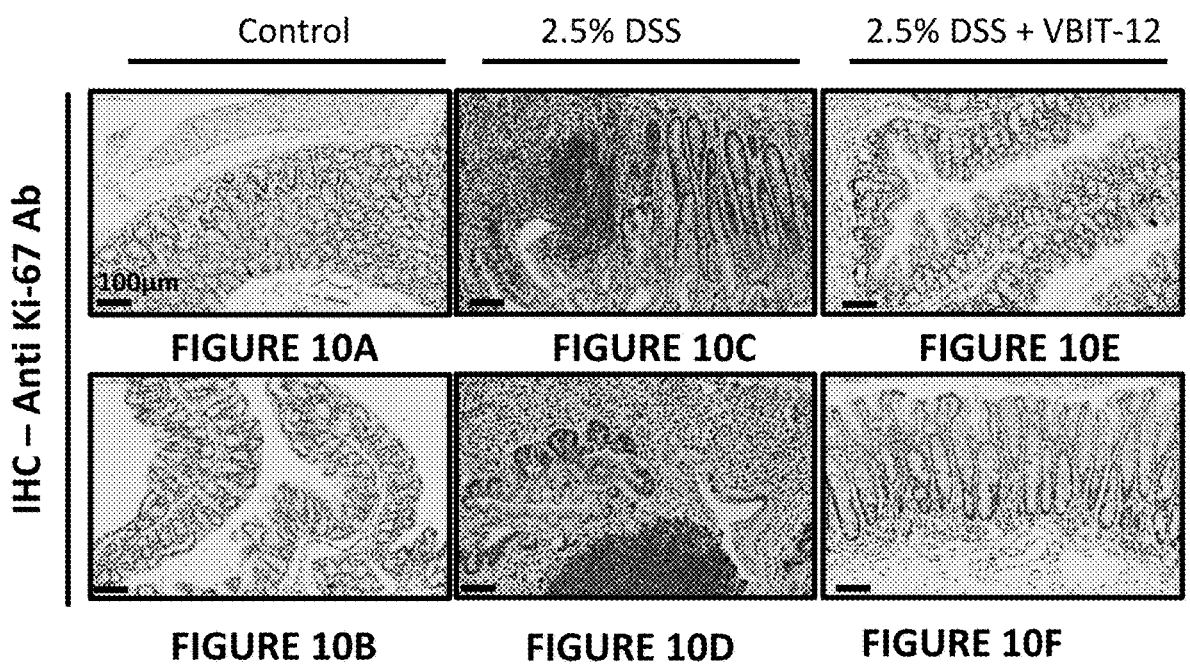
FIGURE 10A  FIGURE 10C  FIGURE 10E
FIGURE 10B  FIGURE 10D  FIGURE 10F

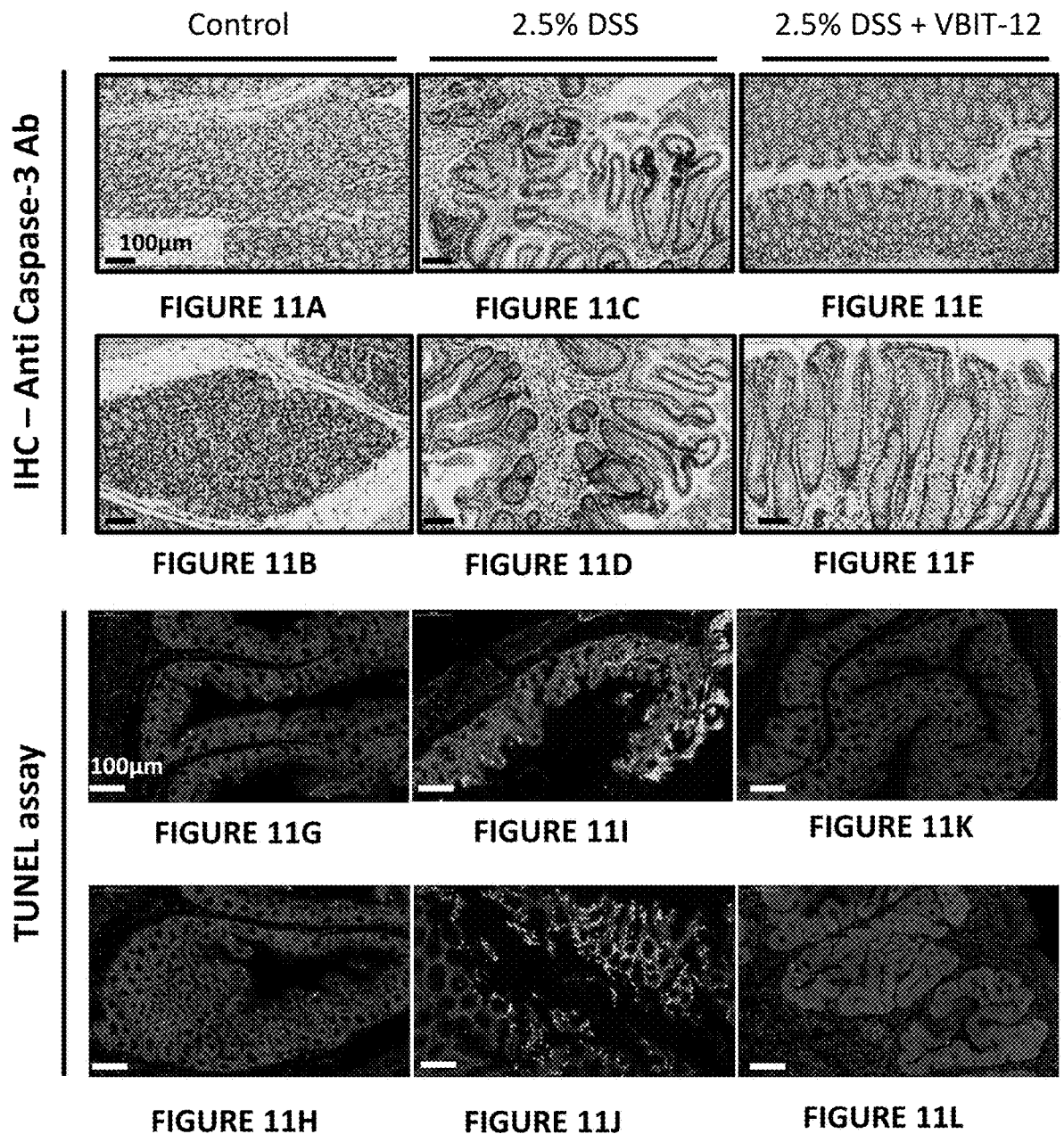

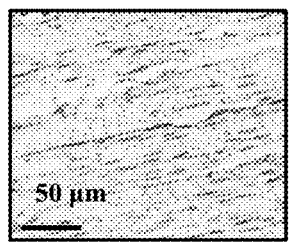   
FIGURE 12A  FIGURE 12B  FIGURE 12C  FIGURE 12D
   
FIGURE 12E  FIGURE 12F  FIGURE 12G  FIGURE 12H
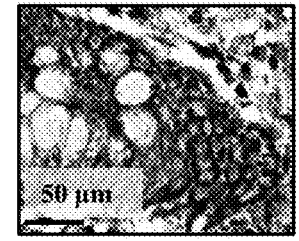 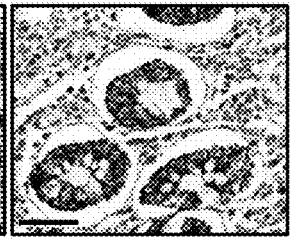 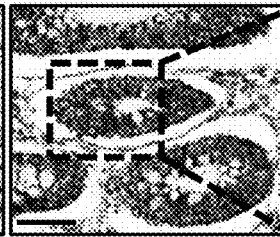 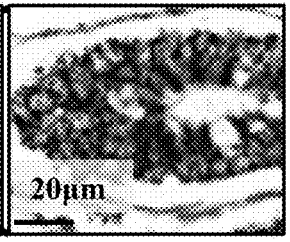
FIGURE 12I  FIGURE 12J  FIGURE 12K  FIGURE 12L
 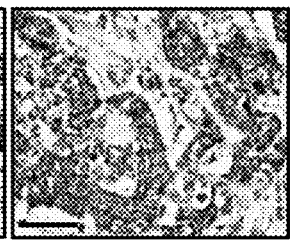  
FIGURE 12M  FIGURE 12N  FIGURE 12O  FIGURE 12P

Normal thyroid

Normal Synovial

Granulomat

Rheumatoide Arthritis

Hashimoto

Psoriasis

Normal lung

Normal colon

Sarkoidose

Morbus Crohn

SEQUENCE LISTING

<160> NUMBER OF SEQ ID NOS: 35

<210> SEQ ID NO 1
<211> LENGTH: 26

```
<212> TYPE: PRT
<213> ORGANISM: Artificial Sequence
<220> FEATURE:
<223> OTHER INFORMATION: Synthetic

<400> SEQUENCE: 1

Met Ala Val Pro Pro Thr Tyr Ala Asp Leu Gly Lys Ser Ala Arg Asp
1               5                   10                  15

Val Phe Thr Lys Gly Tyr Gly Phe Gly Leu
            20                  25

<210> SEQ ID NO 2
<211> LENGTH: 25
<212> TYPE: PRT
<213> ORGANISM: Artificial Sequence
<220> FEATURE:
<223> OTHER INFORMATION: Synthetic
<220> FEATURE:
<221> NAME/KEY: X
<222> LOCATION: (21)..(21)
<223> OTHER INFORMATION: wherein X is any amino acid other than Glycine
<220> FEATURE:
<221> NAME/KEY: X
<222> LOCATION: (23)..(23)
<223> OTHER INFORMATION: wherein X is any amino acid other than Glycine
<220> FEATURE:
<221> NAME/KEY: X
<222> LOCATION: (25)..(25)
<223> OTHER INFORMATION: wherein X is any amino acid other than Glycine

<400> SEQUENCE: 2

Met Ala Val Pro Pro Thr Tyr Ala Asp Leu Gly Ala Ser Ala Ala Asp
1               5                   10                  15

Val Phe Thr Lys Xaa Tyr Xaa Phe Xaa
            20                  25

<210> SEQ ID NO 3
<211> LENGTH: 5
<212> TYPE: PRT
<213> ORGANISM: Artificial Sequence
<220> FEATURE:
<223> OTHER INFORMATION: Synthetic
<220> FEATURE:
<221> NAME/KEY: X
<222> LOCATION: (2)..(4)
<223> OTHER INFORMATION: wherein X is any amino acid

<400> SEQUENCE: 3

Gly Xaa Xaa Xaa Gly
1               5

<210> SEQ ID NO 4
<211> LENGTH: 24
<212> TYPE: PRT
<213> ORGANISM: Artificial Sequence
<220> FEATURE:
<223> OTHER INFORMATION: Synthetic
<220> FEATURE:
<221> NAME/KEY: X
<222> LOCATION: (21)..(21)
<223> OTHER INFORMATION: wherein X is any amino acid other than Glycine
<220> FEATURE:
<221> NAME/KEY: X
<222> LOCATION: (23)..(23)
<223> OTHER INFORMATION: wherein X is any amino acid other than Glycine

<400> SEQUENCE: 4

Met Ala Val Pro Pro Thr Tyr Ala Asp Leu Gly Ala Ser Ala Ala Asp
1               5                   10                  15
```

Val Phe Thr Lys Xaa Tyr Xaa Phe
            20

<210> SEQ ID NO 5
<211> LENGTH: 23
<212> TYPE: PRT
<213> ORGANISM: Artificial Sequence
<220> FEATURE:
<223> OTHER INFORMATION: Synthetic
<220> FEATURE:
<221> NAME/KEY: X
<222> LOCATION: (21)..(21)
<223> OTHER INFORMATION: wherein X is any amino acid other than Glycine
<220> FEATURE:
<221> NAME/KEY: X
<222> LOCATION: (23)..(23)
<223> OTHER INFORMATION: wherein X is any amino acid other than Glycine

<400> SEQUENCE: 5

Met Ala Val Pro Pro Thr Tyr Ala Asp Leu Gly Ala Ser Ala Ala Asp
1               5                   10                  15

Val Phe Thr Lys Xaa Tyr Xaa
            20

<210> SEQ ID NO 6
<211> LENGTH: 22
<212> TYPE: PRT
<213> ORGANISM: Artificial Sequence
<220> FEATURE:
<223> OTHER INFORMATION: Synthetic
<220> FEATURE:
<221> NAME/KEY: X
<222> LOCATION: (21)..(21)
<223> OTHER INFORMATION: wherein X is any amino acid other than Glycine

<400> SEQUENCE: 6

Met Ala Val Pro Pro Thr Tyr Ala Asp Leu Gly Ala Ser Ala Ala Asp
1               5                   10                  15

Val Phe Thr Lys Xaa Tyr
            20

<210> SEQ ID NO 7
<211> LENGTH: 21
<212> TYPE: PRT
<213> ORGANISM: Artificial Sequence
<220> FEATURE:
<223> OTHER INFORMATION: Synthetic
<220> FEATURE:
<221> NAME/KEY: X
<222> LOCATION: (21)..(21)
<223> OTHER INFORMATION: wherein X is any amino acid other than Glycine

<400> SEQUENCE: 7

Met Ala Val Pro Pro Thr Tyr Ala Asp Leu Gly Ala Ser Ala Ala Asp
1               5                   10                  15

Val Phe Thr Lys Xaa
            20

<210> SEQ ID NO 8
<211> LENGTH: 20
<212> TYPE: PRT
<213> ORGANISM: Artificial Sequence
<220> FEATURE:
<223> OTHER INFORMATION: Synthetic

<400> SEQUENCE: 8

Met Ala Val Pro Pro Thr Tyr Ala Asp Leu Gly Ala Ser Ala Ala Asp
1               5                   10                  15

Val Phe Thr Lys
            20

<210> SEQ ID NO 9
<211> LENGTH: 20
<212> TYPE: PRT
<213> ORGANISM: Artificial Sequence
<220> FEATURE:
<223> OTHER INFORMATION: Synthetic

<400> SEQUENCE: 9

Met Ala Val Pro Pro Thr Tyr Ala Asp Leu Gly Ala Ser Ala Ala Asp
1               5                   10                  15

Val Phe Thr Lys
            20

<210> SEQ ID NO 10
<211> LENGTH: 24
<212> TYPE: PRT
<213> ORGANISM: Artificial Sequence
<220> FEATURE:
<223> OTHER INFORMATION: Synthetic

<400> SEQUENCE: 10

Met Ala Val Pro Pro Thr Tyr Ala Asp Leu Gly Lys Ser Ala Arg Asp
1               5                   10                  15

Val Phe Thr Lys Gly Tyr Gly Phe
            20

<210> SEQ ID NO 11
<211> LENGTH: 23
<212> TYPE: PRT
<213> ORGANISM: Artificial Sequence
<220> FEATURE:
<223> OTHER INFORMATION: Synthetic

<400> SEQUENCE: 11

Met Ala Val Pro Pro Thr Tyr Ala Asp Leu Gly Lys Ser Ala Arg Asp
1               5                   10                  15

Val Phe Thr Lys Gly Tyr Gly
            20

<210> SEQ ID NO 12
<211> LENGTH: 22
<212> TYPE: PRT
<213> ORGANISM: Artificial Sequence
<220> FEATURE:
<223> OTHER INFORMATION: Synthetic

<400> SEQUENCE: 12

Met Ala Val Pro Pro Thr Tyr Ala Asp Leu Gly Lys Ser Ala Arg Asp
1               5                   10                  15

Val Phe Thr Lys Gly Tyr
            20

<210> SEQ ID NO 13
<211> LENGTH: 21
<212> TYPE: PRT
<213> ORGANISM: Artificial Sequence
<220> FEATURE:
<223> OTHER INFORMATION: Synthetic

<400> SEQUENCE: 13

Met Ala Val Pro Pro Thr Tyr Ala Asp Leu Gly Lys Ser Ala Arg Asp

```
1               5                   10                  15

Val Phe Thr Lys Gly
            20

<210> SEQ ID NO 14
<211> LENGTH: 17
<212> TYPE: PRT
<213> ORGANISM: Artificial Sequence
<220> FEATURE:
<223> OTHER INFORMATION: Synethetic

<400> SEQUENCE: 14

Met Arg Gln Ile Lys Ile Trp Phe Gln Asn Arg Arg Met Lys Trp Lys
1               5                   10                  15

Lys

<210> SEQ ID NO 15
<211> LENGTH: 7
<212> TYPE: PRT
<213> ORGANISM: Artificial Sequence
<220> FEATURE:
<223> OTHER INFORMATION: Sythnetic

<400> SEQUENCE: 15

His Ala Ile Tyr Pro Arg His
1               5

<210> SEQ ID NO 16
<211> LENGTH: 7
<212> TYPE: PRT
<213> ORGANISM: Artificial Sequence
<220> FEATURE:
<223> OTHER INFORMATION: Synthetic

<400> SEQUENCE: 16

His Arg Pro Tyr Ile Ala His
1               5

<210> SEQ ID NO 17
<211> LENGTH: 1993
<212> TYPE: DNA
<213> ORGANISM: Homo sapiens

<400> SEQUENCE: 17
attagcgcag ggacctccgg gccacagctc agagaatcgg aaggcctcct ccccttccc      60 gagcgctgcc actggggccg aggtttccag caagaacccg cgtgtccctg cgcacgcaca    120
cacggtgcac acgtcagtcc ggcgcctccc cgtgccccga ctcacgcagg tcctcccgcg    180
cgcccgcaac acgcccgcag gctcctgtgt ctgctgccgg ggcagcgggg cccggaaggc    240
agaagatggc tgtgccaccc acgtatgccg atcttggcaa atctgccagg gatgtcttca    300
ccaagggcta tggatttggc ttaataaagc ttgatttgaa acaaaatct gagaatggat      360 tggaatttac aagctcaggc tcagccaaca ctgagaccac caaagtgacg ggcagtctgg    420
aaaccaagta cagatggact gagtacggcc tgacgtttac agagaaatgg aataccgaca    480
atacactagg caccgagatt actgtggaag atcagcttgc acgtggactg aagctgacct    540
tcgattcatc cttctcacct aacactggga aaaaaaatgc taaaatcaag acagggtaca    600
agcgggagca cattaacctg ggctgcgaca tggatttcga cattgctggg ccttccatcc    660
ggggtgctct ggtgctaggt tacgagggct ggctggccgg ctaccagatg aattttgaga    720
ctgcaaaatc ccgagtgacc cagagcaact ttgcagttgg ctacaagact gatgaattcc    780
```

-continued

```
agcttcacac taatgtgaat gacgggacag agtttggcgg ctccatttac cagaaagtga      840
acaagaagtt ggagaccgct gtcaatcttg cctggacagc aggaaacagt aacacgcgct      900
tcggaatagc agccaagtat cagattgacc ctgacgcctg cttctcggct aaagtgaaca      960
actccagcct gataggttta ggatacactc agactctaaa gccaggtatt aaactgacac     1020
tgtcagctct tctggatggc aagaacgtca atgctggtgg ccacaagctt ggtctaggac     1080
tggaatttca agcataaatg aatactgtac aattgtttaa ttttaaacta ttttgcagca     1140
tagctacctt cagaatttag tgtatctttt aatgttgtat gtctgggatg caagtattgc     1200
taaatatgtt agccctccag gttaaagttg attcagcttt aagatgttac ccttccagag     1260
gtacagaaga aacctatttc caaaaaggt cctttcagtg gtagactcgg ggagaacttg      1320 gtggccctt tgagatgcca ggtttctttt ttatctagaa atggctgcaa gtggaagcgg      1380
ataatatgta ggcactttgt aaattcatat tgagtaaatg aatgaaattg tgatttcctg     1440
agaatcgaac cttggttccc taaccctaat tgatgagagg ctcgctgctt gatggtgtgt     1500
acaaactcac ctgaatggga cttttttaga cagatcttca tgacctgttc ccaccccagt    1560
tcatcatcat ctcttttaca ccaaaaggtc tgcagggtgt ggtaactgtt tcttttgtgc    1620 catttgggg tggagaaggt ggatgtgatg aagccaataa ttcaggactt attccttctt     1680
gtgttgtgtt ttttttggc ccttgcacca gagtatgaaa tagcttccag gagctccagc     1740
tataagcttg gaagtgtctg tgtgattgta atcacatggt gacaacactc agaatctaaa    1800
ttggacttct gttgtattct caccactcaa tttgttttt agcagtttaa tgggtacatt    1860
ttagagtctt ccattttgtt ggaattagat cctccccttc aaatgctgta attaacaaca    1920 cttaaaaac ttgaataaaa tattgaaacc tcatccttct tctgttgtct ttattaataa     1980
aatataaata aac                                                       1993
```

```
<210> SEQ ID NO 18
<211> LENGTH: 19
<212> TYPE: DNA
<213> ORGANISM: Artificial Sequence
<220> FEATURE:
<223> OTHER INFORMATION: Synthetic

<400> SEQUENCE: 18
acacuaggca ccgagauua                                                   19

<210> SEQ ID NO 19
<211> LENGTH: 19
<212> TYPE: DNA
<213> ORGANISM: Artificial Sequence
<220> FEATURE:
<223> OTHER INFORMATION: Synthetic

<400> SEQUENCE: 19
gggcuaugga uuuggcuua                                                   19

<210> SEQ ID NO 20
<211> LENGTH: 19
<212> TYPE: DNA
<213> ORGANISM: Artificial Sequence
<220> FEATURE:
<223> OTHER INFORMATION: Synthetic

<400> SEQUENCE: 20
gcuuggucua ggacuggaa                                                   19
```

<210> SEQ ID NO 21
<211> LENGTH: 19
<212> TYPE: DNA
<213> ORGANISM: Artificial Sequence
<220> FEATURE:
<223> OTHER INFORMATION: Synthetic

<400> SEQUENCE: 21
aagcugaccu ucgauucau                                                  19

<210> SEQ ID NO 22
<211> LENGTH: 19
<212> TYPE: DNA
<213> ORGANISM: Artificial Sequence
<220> FEATURE:
<223> OTHER INFORMATION: Synthetic

<400> SEQUENCE: 22
gaaugacggg acagaguuu                                                  19

<210> SEQ ID NO 23
<211> LENGTH: 19
<212> TYPE: DNA
<213> ORGANISM: Artificial Sequence
<220> FEATURE:
<223> OTHER INFORMATION: Synthetic

<400> SEQUENCE: 23
ucggaauagc agccaagua                                                  19

<210> SEQ ID NO 24
<211> LENGTH: 19
<212> TYPE: DNA
<213> ORGANISM: Artificial Sequence
<220> FEATURE:
<223> OTHER INFORMATION: Synthetic

<400> SEQUENCE: 24
cucuucugga uggcaagaa                                                  19

<210> SEQ ID NO 25
<211> LENGTH: 20
<212> TYPE: DNA
<213> ORGANISM: Artificial Sequence
<220> FEATURE:
<223> OTHER INFORMATION: Synthetic

<400> SEQUENCE: 25
gaauagcagc caaguaucag                                                 20

<210> SEQ ID NO 26
<211> LENGTH: 19
<212> TYPE: DNA
<213> ORGANISM: Artificial Sequence
<220> FEATURE:
<223> OTHER INFORMATION: Synthetic

<400> SEQUENCE: 26
uaagccaaau ccauagccc                                                  19

<210> SEQ ID NO 27
<211> LENGTH: 19
<212> TYPE: DNA
<213> ORGANISM: Artificial Sequence
<220> FEATURE:
<223> OTHER INFORMATION: Synthetic

```
<400> SEQUENCE: 27
uuccaguccu agaccaagc                                                    19

<210> SEQ ID NO 28
<211> LENGTH: 19
<212> TYPE: DNA
<213> ORGANISM: Artificial Sequence
<220> FEATURE:
<223> OTHER INFORMATION: Synthetic

<400> SEQUENCE: 28
ugauacuugg cugcuauuc                                                    19

<210> SEQ ID NO 29
<211> LENGTH: 19
<212> TYPE: DNA
<213> ORGANISM: Artificial Sequence
<220> FEATURE:
<223> OTHER INFORMATION: Synthetic
<220> FEATURE:
<221> NAME/KEY: modified_base
<222> LOCATION: (5)..(5)
<223> OTHER INFORMATION: um
<220> FEATURE:
<221> NAME/KEY: modified_base
<222> LOCATION: (8)..(8)
<223> OTHER INFORMATION: gm
<220> FEATURE:
<221> NAME/KEY: modified_base
<222> LOCATION: (13)..(13)
<223> OTHER INFORMATION: gm
<220> FEATURE:
<221> NAME/KEY: modified_base
<222> LOCATION: (17)..(17)
<223> OTHER INFORMATION: um

<400> SEQUENCE: 29
acacuaggca ccgagauua                                                    19

<210> SEQ ID NO 30
<211> LENGTH: 19
<212> TYPE: DNA
<213> ORGANISM: Artificial Sequence
<220> FEATURE:
<223> OTHER INFORMATION: Synthetic
<220> FEATURE:
<221> NAME/KEY: modified_base
<222> LOCATION: (6)..(6)
<223> OTHER INFORMATION: um
<220> FEATURE:
<221> NAME/KEY: modified_base
<222> LOCATION: (16)..(16)
<223> OTHER INFORMATION: gm

<400> SEQUENCE: 30
uaaucucggu gccuagugu                                                    19

<210> SEQ ID NO 31
<211> LENGTH: 19
<212> TYPE: DNA
<213> ORGANISM: Artificial Sequence
<220> FEATURE:
<223> OTHER INFORMATION: Synthetic

<400> SEQUENCE: 31
uaaucucggu gccuagugu                                                    19

<210> SEQ ID NO 32
```

```
<211> LENGTH: 22
<212> TYPE: DNA
<213> ORGANISM: Artificial Sequence
<220> FEATURE:
<223> OTHER INFORMATION: Synthetic
<220> FEATURE:
<221> NAME/KEY: modified_base
<222> LOCATION: (4)..(4)
<223> OTHER INFORMATION: um or uracil
<220> FEATURE:
<221> NAME/KEY: modified_base
<222> LOCATION: (14)..(14)
<223> OTHER INFORMATION: gm
<220> FEATURE:
<221> NAME/KEY: modified_base
<222> LOCATION: (17)..(17)
<223> OTHER INFORMATION: um or uracil

<400> SEQUENCE: 32
gaauagcagc caaguaucag tt                                              22

<210> SEQ ID NO 33
<211> LENGTH: 21
<212> TYPE: DNA
<213> ORGANISM: Artificial Sequence
<220> FEATURE:
<223> OTHER INFORMATION: Synthetic
<220> FEATURE:
<221> NAME/KEY: modified_base
<222> LOCATION: (7)..(7)
<223> OTHER INFORMATION: um
<220> FEATURE:
<221> NAME/KEY: modified_base
<222> LOCATION: (13)..(13)
<223> OTHER INFORMATION: gm

<400> SEQUENCE: 33
ugauacuugg cugcuauuct t                                               21

<210> SEQ ID NO 34
<211> LENGTH: 19
<212> TYPE: DNA
<213> ORGANISM: Artificial Sequence
<220> FEATURE:
<223> OTHER INFORMATION: Synthetic

<400> SEQUENCE: 34
tcctccgtga aaccaacaa                                                  19

<210> SEQ ID NO 35
<211> LENGTH: 18
<212> TYPE: DNA
<213> ORGANISM: Artificial Sequence
<220> FEATURE:
<223> OTHER INFORMATION: Synthetic

<400> SEQUENCE: 35
agcgagaaga ggggcatt                                                   18
```

VDAC INHIBITORS FOR TREATING INFLAMMATORY BOWEL DISEASES

CROSS REFERENCE TO RELATED APPLICATIONS

This application is a National Phase of PCT Patent Application No. PCT/IL2019/051291 having International filing date of Nov. 26, 2019, which claims the benefit of priority under 35 U.S.C. § 119(e) of U.S. Provisional Patent Application No. 62/771,213 titled "VDAC INHIBITORS FOR TREATING INFLAMMATORY BOWEL DISEASES", filed Nov. 26, 2018. The contents of the above applications are all incorporated by reference as if fully set forth herein in their entirety.

FIELD OF THE INVENTION

The present invention relates to methods for treating inflammatory bowel diseases (IBD). Particularly, the present invention relates to Voltage-Dependent Anion Channel (VDAC1) inhibitors for use in treatment of IBDs.

BACKGROUND

Inflammatory bowel diseases (IBD), which includes Crohn's disease and ulcerative colitis (UC), is a relapsing and remitting condition characterized by chronic inflammation at various sites in the gastrointestinal tract (GI), which results in diarrhea and abdominal pain.

Bowel inflammation results from a cell-mediated immune response in the GI mucosa. The precise etiology is unknown, but evidence suggests that the normal intestinal flora trigger an abnormal immune reaction in patients with a multifactorial genetic predisposition (perhaps involving abnormal epithelial barriers and mucosal immune defenses). No specific environmental, dietary, or infectious causes have been identified. The immune reaction involves the release of inflammatory mediators, including cytokines, interleukins, and TNF.

Mitochondrial DNA is circular DNA that encodes 37 genes, including subunits of protein complexes essential for oxidative phosphorylation. Although mtDNA is present in thousands of copies per cell, most mtDNA does not exist in a free form, but is packaged into nucleoids, large structures that are tethered to the matrix side of the inner mitochondrial membrane (IMM). Although the mechanism is not entirely clear, mtDNA or its fragments from stressed mitochondria can be released into the cytosol where it can interact with and activate a large number of immunostimulatory DNA sensors.

The voltage-dependent anion channel (VDAC), which is composed of three isoforms (VDAC1, 2 and 3), is the most abundant protein in OMNI and regulates metabolism, inflammasome activation and cell death (Shoshan-Barmatz et al., 2018). The pore of the monomer may be too small to allow mtDNA (2 nm diameter) to cross the OMNI, but VDAC is found in a dynamic equilibrium between monomeric and oligomeric states, and the oligomers may form pores significantly larger than that of the monomer.

Currently, there remains an unmet need for improved methods of treating IBDs (e.g., Chron's disease, ulcerative colitis (UC)), which provide increased efficacy but do not involve broad immune suppression.

SUMMARY

The present invention provides methods for slowing the progression of or treating an IBD comprising reducing the expression or activity of VDAC in a subject in need thereof.

Mitochondrial DNA (mtDNA) and its fragments released either into the cytosol and/or the extracellular space plays a major role in induction and/or promotion of inflammation. The invention is based, in part, on the finding that VDAC1 is overexpressed in inflammatory bowel disease and inhibiting VDAC-1 ameliorated some of the hallmark characteristics of inflammatory bowel disease in an acceptable mice model. VDAC-1 specific inhibitors reduced mouse weight loss and colon shortening while also increasing survival rates. Further, VDAC-1 specific inhibitors, e.g., VBIT compounds as well as siRNA, have successfully reduced mtDNA secretion/leakage under oxidative conditions which are known to promote mt-DNA release.

According to one aspect, there is provided a method for slowing the progression of or treating inflammatory bowel disease (IBD) comprising administering to a subject in need of such treatment a pharmaceutical composition comprising a therapeutically effective amount of a VDAC inhibiting compound.

In some embodiments, the VDAC inhibitor is a compound of the general Formula (I):

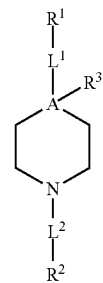

Formula I wherein: A is carbon (C) or nitrogen (N); $R^3$ is absent, or is selected from a hydrogen, an unsubstituted or substituted amide or a heteroalkyl group comprising 3-12 atoms apart from hydrogen atoms, wherein at least one of said 3-12 atoms is a heteroatom, selected from nitrogen, sulfur and oxygen; wherein when A is nitrogen (N), $R^3$ is absent; $L^1$ is absent or is an amino linking group —$NR^4$—, wherein $R^4$ is hydrogen, a $C_{1-5}$-alkyl, a $C_{1-5}$-alkylene or a substituted alkyl —$CH_2R$, wherein R is a functional group selected from the group consisting of hydrogen, halo, haloalkyl, cyano, nitro, hydroxyl, alkyl, alkenyl, aryl, alkoxyl, aryloxyl, aralkoxyl, alkylcarbamido, arylcarbamido, amino, alkylamino, arylamino, dialkylamino, diarylamino, arylalkylamino, aminocarbonyl, alkylaminocarbonyl, arylaminocarbonyl, alkylcarbonyloxy, arylcarbonyloxy, carboxyl, alkoxycarbonyl, aryloxycarbonyl, sulfo, alkylsulfonylamido, alkyl sulfonyl, arylsulfonyl, alkylsulfinyl, arylsulfinyl and heteroaryl; $R^1$ is an aromatic moiety, which is optionally substituted with one or more of Z; Z is independently at each occurrence a functional group selected from the group consisting of, hydrogen, halo, haloalkyl, haloalkoxy, perhaloalkoxy or $C_{1-2}$-perfluoroalkoxy, cyano, nitro, hydroxyl, alkyl, alkenyl, aryl, alkoxyl, aryloxyl, aralkoxyl, alkylcarbamido, arylcarbamido, amino, alkylamino, arylamino, dialkylamino, diarylamino, arylalkylamino, aminocarbonyl, alkylaminocarbonyl, arylaminocarbonyl, alkylcarbonyloxy, arylcarbonyloxy, carboxyl, alkoxycarbonyl, aryloxycarbonyl, sulfo, alkylsulfonylamido, alkylsulfonyl, arylsulfonyl, alkylsulfinyl, arylsulfinyl and heteroaryl; $L^2$ is a linking group, such that when A is nitrogen (N), $L^2$ is a group consisting of 4-10 atoms, apart from hydrogen atoms, optionally forming a ring, whereof at least one of the atoms is nitrogen, said nitrogen forming part of an amide group; and when A is carbon (C), then $L^2$ is selected from $C_{1-4}$ alkylene or a group consisting of 4-10 atoms, apart from hydrogen atoms, optionally forming a ring, whereof at least one of the atoms is nitrogen, said nitrogen forming part of an amide group; and $R^2$ is a phenyl or a naphthyl, optionally substituted with a halogen; or an enantiomer, diastereomer, mixture or salt thereof.

According to some embodiments, the compound has the formula selected from the group consisting of formulae 1, 2, 3, 4, 5, 6, 7, 8, 9, 10, and 11.

According to one embodiment, the compound is N-(4-chlorophenyl)-4-hydroxy-3-(4-(4-(trifluoromethoxy)phenyl)-piperazin-1-yl)butanamide (Formula 1), designated throughout the specification VBIT-4.

According to another embodiment, the compound is 1-(4-chlorophenyl)-3-(4-(4-(trifluoromethoxy)phenyl)piperazin-1-yl)pyrrolidine-2,5-dione (Formula 2), designated throughout the specification VBIT-3.

According to a further embodiment, the compound is (1-(naphthalen-2-ylmethyl)-4-(phenylamino)piperidine-4-carbonyl)glycine (Formula 3), designated throughout the specification VBIT-12.

According to some embodiments, the VDAC inhibitor is a peptide derived from or corresponding to amino acids residues 1-26 of human VDAC1 N-terminal domain (SEQ ID NO:1) comprising: (i) one or more mutations compared to SEQ ID NO:1, (ii) a truncation of one or more amino acids compared to SEQ ID NO:1, or a combination thereof.

According to some embodiments, the VDAC inhibitor is a peptide of 1-25 amino acids comprising a contiguous sequence derived from amino acids residues 1-26 of human VDAC1 N-terminal domain comprising the amino acid sequence: MAVPPTYADLGKSARDVFTKXYXFX (SEQ ID NO:2), wherein X is any amino acid other than glycine.

According to certain exemplary embodiments, the peptide comprises an amino acid sequence selected from the group consisting of: SEQ ID Nos.:4-13.

According to some embodiments, the VDAC inhibitor is a VDAC silencing oligonucleotide molecule, or a construct comprising same. Any VDAC silencing oligonucleotide molecule may be used in the methods of the present invention, as long as the oligonucleotide comprises at least 15 contiguous nucleic acids identical to SEQ ID NO:17, to an mRNA molecule encoded by same or to a sequence complementary thereto.

According to certain embodiments, the silencing oligonucleotide comprises a nucleic acid sequence selected from the group consisting of: SEQ ID NO:18; SEQ ID NO:19; SEQ ID NO:20; SEQ ID NO:21; SEQ ID NO:22; SEQ ID NO:23; SEQ ID NO:24; and SEQ ID NO:25. According to some embodiments, the autoimmune disease is selected from the group consisting of autoimmune diseases involving a systemic autoimmune disorder and autoimmune diseases involving a single organ or single cell-type disorder.

In some embodiments, the IBD is selected from the group consisting of Chron's disease and ulcerative colitis (UC).

In some embodiments, the pharmaceutical composition further comprises a pharmaceutically acceptable excipient.

In some embodiments, the pharmaceutical composition is administered orally or parenterally.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE FIGURES

FIGS. 6A-6D are micrographs of histological sections of DSS-induced IBD in C57BL/6 mice, stained with hematoxylin and eosin (H&E). Scale bar represents 100 μm. (6A) Control; (6B) 2.5% DSS; (6C) DSS+VBIT-4; and (6D) DSS+VBIT-12.

FIGS. 7A-7D are micrographs of histological sections of DSS-induced IBD in C57BL/6 mice highlighting the effects of VBIT-4 and VIBT-12 on the colon wall thickness and lymphatic infiltration thereto. (7A) Control; (7B) 2.5% DSS; (7C) DSS+VBIT-12; and (6D) DSS+VBIT-4.

FIGS. 8A-8D are micrographs of histological sections of DSS-induced IBD in C57BL/6 mice, immunostained with an anti VDAC-1 specific antibody. (8A) Control; (8B) 2.5% DSS; (8C) 2.5% DSS+VBIT-4; and (8D) 2.5% DSS+VBIT-12.

FIGS. 9A-9C are a scheme of a non-limiting protocol and results presented as vertical bar graphs. (9A) is a scheme of a non-limiting protocol for examining the effects of VBIT-12 administered by gavage once or twice a day to DSS-mice. (9B-9C) are graphs showing that administering twice resulted in a better effect on the reduction of colon length (9B) as well as on the decreasing the spleen weight (9C). The spleen weight was analyzed for the various groups showing increased weight of in the DSS-treated group that was decreased by VBIT-12 to close to the weight in the DSS-untreated control group (9C). Increased spleen weights generally correlate with the extent of inflammation and anemia. All data are expressed as mean±SEM, (n=3) (*p<0.05; p<0.01, *p<0.001).

FIGS. 10A-10F are micrographs showing paraffin-embedded-fixed sections IHC-stained with the proliferation marker anti-Ki-67 antibodies. Groups were as follows: control (10A-10B), DSS-treated mice (10C-10D) and DSS-treated mice subjected to VBIT-12 (10E-10F; 20 mg/Kg). The results (10A-10B), (10C-10D); and (10E-10F) are colon images from 2 representative mice for each group. The results show increased Ki-67 staining in the DSS-treated mice that was eliminated when treated with VBIT-12.

FIGS. 11A-11L are micrographs showing paraffin-embedded-fixed sections which were IHC-stained with anti-caspase 3 antibodies (11A-11F) or processed for TUNEL assay (using the DeadEnd Fluorometric TUNEL system (11G-11L). Groups: control (11A-11B, and 11G-11H), DSS-treated mice (11C-11D, and 11I-11J), and DSS-treated mice subjected to VBIT-12 (11E-11F, and 11K-11L; 20 mg/Kg). The results show increased activated caspase levels and apoptosis (TUNEL) that were reduced in VBIT-12-treated mice. Each of (11A-11B, and 11G-11H), (11C-11D, and 11I-11J); and (11E-11F, and 11L-11K) are micrographs from 2 representative mice for each group.

FIGS. 12A-12Q are micrographs, and a vertical bar graph, showing that VDAC1 is overexpressed in human colon pathological conditions. (12A-12P) are micrographs of immunohistochemical staining of VDAC1, which was performed on tissue microarray slide. The array contained colon sections from: healthy (12A-12D), chronic ulcerative colitis (12E-12H), Crohn's disease (12I-12L), and adenocarcinoma (12M-12P). Representative sections of the indicated tissues were incubated overnight at 4° C. with anti-VDAC1 antibodies diluted in 1% BSA in PBS and then with secondary antibodies diluted in 1% BSA in PBS. The slides were subsequently treated with 3'3-diaminobenzidine tetra-hydrochloride (DAB) and counter-stained with hematoxylin. Negative controls were incubated without primary antibody. Sections of tissue were observed under an Olympus microscope and images were taken at 200× magnification with the same light intensity and exposure time. (12Q) Quantitation of VDAC1 expression levels in the whole area of the provided sections, as reflected in the staining intensity was performed using a panoramic microscope and HistoQuant software (Quant Center 2.0 software, 3DHISTECH Ltd).

DETAILED DESCRIPTION

Figure 1:
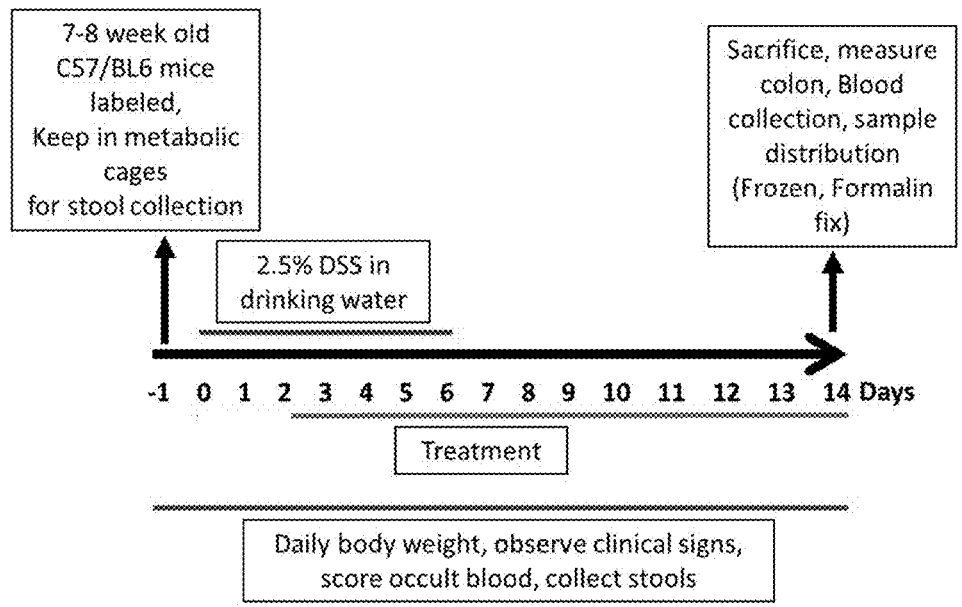
FIG. 1 is a scheme of a non-limiting protocol for dextran sodium sulfate-induced inflammatory bowel disease (DSS-induced IBD).

The present invention provides methods for treating an IBD which comprise administering to a subject in need of such treatment a VDAC inhibitor or a pharmaceutical composition comprising same.

The present invention further provides methods for treating an IBD, slowing the progression of an IBD or one or more symptoms associated therewith, the method comprising administering to a subject in need of such treatment a VDAC inhibitor or a pharmaceutical composition comprising same.

In some embodiments, the methods comprise administering a therapeutically effective amount of at least one piperazine- or piperidine-derivative such as disclosed herein below.

Piperazine Compounds

According to some embodiments, a piperazine- or piperidine-derivative to be used for method of the invention is of general Formula (I):

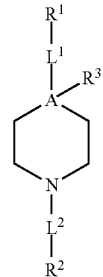

Formula (I)

wherein: A is carbon (C) or nitrogen (N); $R^3$ is absent, or is selected from a hydrogen, an unsubstituted or substituted amide or a heteroalkyl group comprising 3-12 atoms apart from hydrogen atoms, wherein at least one of said 3-12 atoms is a heteroatom, selected from nitrogen, sulfur and oxygen; wherein when A is nitrogen (N), $R^3$ is absent; $L^1$ is absent or is an amino linking group —$NR_4$—, wherein $R^4$ is hydrogen, a $C_{1-5}$-alkyl, a $C_{1-5}$-alkylene or a substituted alkyl —$CH_2R$, wherein R is a functional group selected from hydrogen, halo, haloalkyl, cyano, nitro, hydroxyl, alkyl, alkenyl, aryl, alkoxyl, aryloxyl, aralkoxyl, alkylcarbamido, arylcarbamido, amino, alkylamino, arylamino, dialkylamino, diarylamino, arylalkylamino, aminocarbonyl, alkylaminocarbonyl, arylaminocarbonyl, alkylcarbonyloxy, arylcarbonyloxy, carboxyl, alkoxycarbonyl, aryloxycarbonyl, sulfo, alkylsulfonylamido, alkyl sulfonyl, aryl sulfonyl, alkylsulfinyl, arylsulfinyl and heteroaryl; preferably $R^4$ is hydrogen; $R^1$ is an aromatic moiety, preferably phenyl, which may be substituted with one or more of Z; Z is independently at each occurrence a functional group selected from hydrogen, halo, haloalkyl, haloalkoxy, perhaloalkoxy or $C_{1-2}$-perfluoroalkoxy, cyano, nitro, hydroxyl, alkyl, alkenyl, aryl, alkoxyl, aryloxyl, aralkoxyl, alkylcarbamido, arylcarbamido, amino, alkylamino, arylamino, dialkylamino, diarylamino, arylalkylamino, aminocarbonyl, alkylaminocarbonyl, arylaminocarbonyl, alkylcarbonyloxy, arylcarbonyloxy, carboxyl, alkoxycarbonyl, aryloxycarbonyl, sulfo, alkylsulfonylamido, alkylsulfonyl, arylsulfonyl, alkylsulfinyl, arylsulfinyl and heteroaryl; preferably Z is $C_{1-2}$-perfluoroalkoxy; preferably when A is nitrogen (N) $R^1$ is a phenyl and Z is trifluoromethoxy; preferably $R^1$ is a phenyl substituted with one trifluoromethoxy, most preferably at the para position; preferably when A is carbon (C) $R^1$ is an unsubstituted phenyl; $L^2$ is a linking group, such that when A is nitrogen (N), $L^2$ is a group comprising 4-10 atoms (apart from hydrogen atoms), optionally forming a ring, whereof at least one of the atoms is nitrogen, the nitrogen forming part of an amide group; preferably the linking group is selected from a $C_{4-6}$-alkylamidylene and a pyrrolidinylene, said linking group optionally substituted with one or two of alkyl, hydroxy, oxo or thioxo group; most preferably $L^2$ is selected from butanamidylene, N-methylbutanamidylene, N,N-dimethylbutanamidylene, 4-hydroxybutanamidylene (HO—CH$_2$—C*H—CH$_2$—C(O)NH—, wherein the asterisk denotes attachment point), 4-oxobutanamidylene, 4-hydroxy-N-methylbutanamidylene, 4-oxo-N-methylbutanamidylene, 2-pyrrolidonyl, pyrrolidine-2,5-dionylene, 5-thioxo-2-pyrrolidinonylene and 5-methoxy-2-pyrrolidinonylene; and when A is carbon (C), then $L^2$ is either as defined for $L^2$ when A is nitrogen (N) or $C_{1-4}$ alkylene; $L^2$ is preferably methylene (—CH$_2$—); $R^2$ is a phenyl or a naphthyl, optionally substituted with halogen, preferably when $R^2$ is a phenyl it is substituted with halogen, preferably chlorine, at the para position, preferably when $R^2$ is unsubstituted naphthyl, $L^2$ is an alkylene group, preferably —CH$_2$—;

In some embodiments, the method comprises administering to a subject in need thereof at least one compound of general Formula (I) with a proviso that when A is carbon (C), $L^1$ is —NR$^4$—, $R^4$ is hydrogen, and $R^2$ is phenyl substituted with chlorine, then $L^2$ is not pyrrolidine-2,5-dione.

In some embodiments, $R^3$ is hydrogen or heteroalkyl group comprising 3-12 atoms apart from hydrogen atoms, wherein at least one of said 3-12 atoms is a heteroatom, selected from nitrogen, sulfur and oxygen. In some embodiments, $R^3$ is a C(O)NHCH$_2$C(O)OH group. In other embodiments (i.e., when A is nitrogen), $R^3$ is absent.

In some embodiments, $R^4$ is hydrogen.

In some embodiments, R1 is a phenyl substituted with trifluoromethoxy. In some embodiments, $R^1$ is a phenyl substituted with one trifluoromethoxy. In some embodiments, $R^1$ is a phenyl substituted with one trifluoromethoxy at the para position. In some embodiments, $R^1$ is phenyl.

In some embodiments, $L^2$ is a linking group, comprising 4-10 atoms (apart from hydrogen atoms), optionally forming a ring, whereof at least one of the atoms is nitrogen, said nitrogen forming part of an amide group; preferably said linking group is selected from a $C_{4-6}$-alkylamidylene and a pyrrolidinylene, the linking group optionally substituted with one or two of alkyl, hydroxy, oxo or thioxo group; most preferably $L^2$ is selected from butanamidylene, N-methylbutanamidylene, N,N-dimethylbutanamidylene, 4-hydroxybutanamidylene (HO—CH$_2$—C*H—CH$_2$—C(O)NH— wherein the asterisk denotes attachment point), 4-oxobutanamidylene, 4-hydroxy-N-methylbutanamidylene, 4-oxo-N-methylbutanamidylene, 2-pyrrolidonyl, pyrrolidine-2,5-dionylene, 5-thioxo-2-pyrrolidinonylene and 5-methoxy-2-pyrrolidinonylene. Each possibility represents a separate embodiment of the invention. In some embodiments, $L^2$ is 4-hydroxybutanamidylene (HO—CH$_2$—C*H—CH$_2$—C(O)NH—, wherein the asterisk denotes attachment point). In some embodiments, $L^2$ is $C_{1-4}$ alkylene, preferably methylene (—CH$_2$—).

The term "pyrrolidinylene" refers to a pyrrolidine ring as a bivalent substituent. Pyrrolidinylene include unsubstituted and substituted rings, such as, but not limited to, pyrrolidine-2-5-dione, 2-pyrrolidinone, 5-thioxo-2-pyrrolidinone, 5-methoxy-2-pyrrolidinone and the like.

In one embodiment, when A is nitrogen (N), the linking group $L^2$ is selected a $C_{4-6}$-alkylamidylene and a pyrrolidinylene, said linking group optionally substituted with one or two of alkyl, hydroxy, oxo or thioxo group. For example, $L^2$ may be butanamidylene, N-methylbutanamidylene, N,N-dimethylbutanamidylene, 4-hydroxybutanamidylene, 4-oxobutanamidylene, 4-hydroxy-N-methylbutanamidylene, 4-oxo-N-methyl-butanamidylene, 2-pyrrolidonyle, pyrrolidine-2,5-dionylene, 5-thioxo-2-pyrrolidinonylene or 5-methoxy-2-pyrrolidinonylene. Preferably, when $L^2$ is butanamidylene, N-methylbutanamidylene, N,N-dimethylbutanamidylene, 4-hydroxybutanamidylene, 4-oxobutanamidylene, 4-hydroxy-N-methylbutanamidylene or 4-oxo-N-methylbutanamidylene, then preferably the carbon in third position (C) of the butanamide moiety is bonded to the nitrogen (N) of the piperazine ring or the piperidine ring and the nitrogen (N) of the butanamide moiety is bonded to $R^2$. For example, when $L^2$ is 2-pyrrolidone, pyrrolidine-2,5-dione, 5-thioxo-2-pyrrolidone or 5-methoxy-2-pyrrolidone, then preferably a carbon (C) of the pyrrolidine moiety is bonded to the nitrogen (N) of the piperazine ring or the piperidine ring and the nitrogen (N) of the pyrrolidine moiety is bonded to $R^2$, in some embodiments. Alternatively, when $L^2$ is 4-hydroxybutanamidylene, then preferably a carbon (C) of the butanamidylene moiety is bonded to the nitrogen (N) of the piperazine ring and the nitrogen (N) of the butanamidylene moiety is bonded to $R^2$, in some embodiments.

In another embodiment, A is carbon (C), $R^3$ is heteroalkyl and $L^2$ is methylene.

The invention also relates to the stereoisomers, enantiomers, mixtures thereof, and salts, particularly the physiologically acceptable salts, of the compounds of general Formula (I) according to the invention.

According to certain embodiments, the at least one piperazine- or piperidine-derivative is of general Formula Ia:

Formula (Ia)

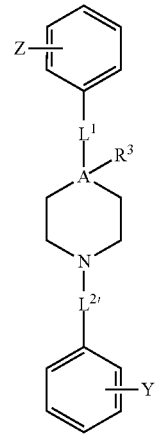

wherein: A, $R^3$, Z and $L^1$ are as previously defined in reference to compound of Formula (I); preferably A is nitrogen (N); $L^{2'}$ is a linking group selected from a $C_4$-alkylamidylene, a $C_5$-alkylamidylene and a $C_6$-alkylamidylene, optionally substituted with one or two of alkyl, hydroxy, oxo or thioxo group; preferably $L^{2'}$ is selected from butanamidylene, N-methylbutanamidylene, N,N-dimethylbutanamidylene, 4-hydroxybutanamidylene, 4-oxobutanamidylene, 4-hydroxy-N-methylbutanamidylene or 4-oxo-N-methylbutanamidylene; most preferably $L^{2'}$ is 4-hydroxybutanamidylene; wherein preferably the carbon (C) at position 3 of the alkyl moiety of alkylamidylene $L^{2'}$ is bonded to the nitrogen (N) of the piperazine ring or of the piperidine ring, and the nitrogen (N) of the butanamide moiety is bonded to the phenyl group; preferably $L^{2'}$ is HO—$CH_2$—C*H—$CH_2$—C(O)NH—, wherein the asterisk denotes attachment point; Y is halogen, preferably chlorine, e.g. at the para position; or an enantiomer, diastereomer, mixture or salt thereof.

According to certain embodiments, the piperazine- or piperidine-derivative is of general Formula (Ib):

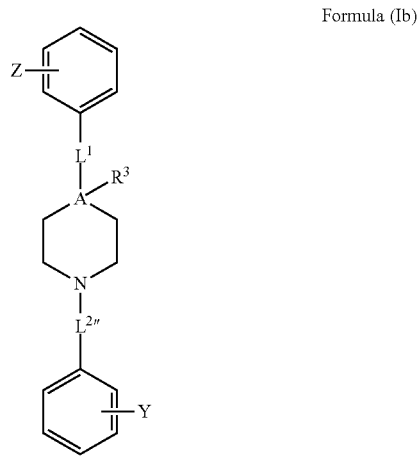

Formula (Ib)

wherein: A, $R^3$, and Z are as previously defined in reference to the compound of Formula (I); preferably A is nitrogen (N); $L^1$ is absent; $L^{2''}$ is a pyrrolidinylene linking group, optionally substituted with one or two of alkyl, hydroxy, oxo or thioxo group, preferably $L^{2''}$ is selected from 2-pyrrolidonylene, pyrrolidine-2,5-dionylene, 5-thioxo-2-pyrrolidinonylene and 5-methoxy-2-pyrrolidinonylene; most preferably $L^{2''}$ is pyrrolidine-2,5-dionylene; wherein preferably a carbon (C) at position 4 or the carbon (C) at position 3 of the pyrrolidinyl moiety $L^{2''}$ is bonded to the nitrogen (N) of the piperazine ring or the piperidine ring and the nitrogen (N) of the pyrrolidinyl moiety is bonded to the phenyl group substituted with Y; and Y is a halogen, preferably chlorine, e.g. at the para position.

According to certain embodiments, the piperazine- or piperidine-derivative is of general Formula (Ic):

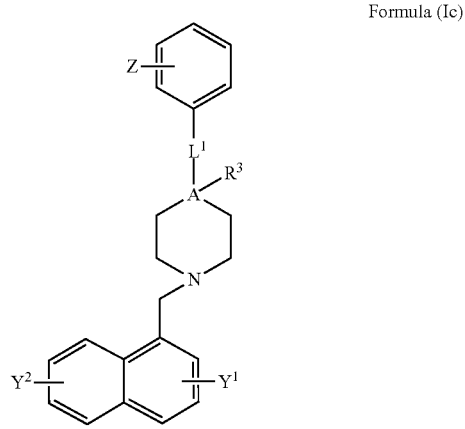

Formula (Ic)

wherein: A, $R^3$, and Z are as previously defined in reference to the compounds of general Formula (I); preferably wherein A is carbon (C); $L^1$ is —NH—; and $Y^1$ and $Y^2$ are each independently absent or a halogen; preferably wherein $Y^1$ and $Y^2$ are each independently absent; or an enantiomer, diastereomer, mixture or salt thereof. Preferred compounds of Formula (Ic) are those wherein $R^3$ is —C(O)NHCH$_2$C(O)OH group, and/or wherein Z is $C_{1-2}$-alkoxy or halogenated $C_{1-2}$-alkoxy, e.g. $C_{1-2}$-perfluoroalkoxy.

According to certain embodiments, the piperazine- or piperadine-derivative is of general Formula (Id):

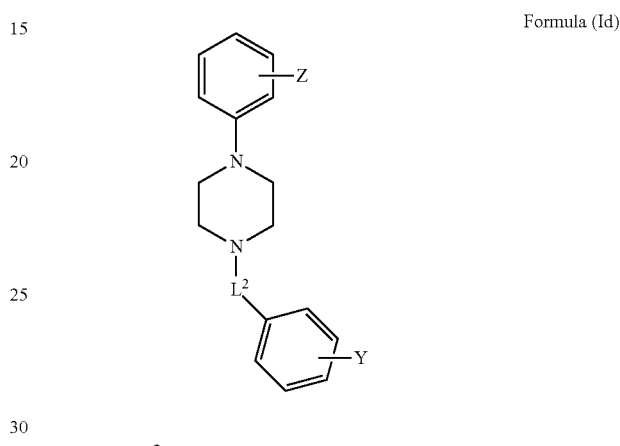

Formula (Id)

wherein: $L^2$ is selected from a $C_{4-6}$-alkylamidylene (e.g. HO—$CH_2$—C*H—$CH_2$—C(O)NH—, wherein the asterisk denotes attachment point), and a pyrrolidinylene (e.g. pyrrolidin-2,5-dionylene), optionally substituted with one or two of alkyl, hydroxy, oxo or thioxo group; and Z is haloalkoxy, e.g. $C_{1-2}$-perfluoroalkoxy, preferably, $OCF_3$, and Y is a halogen.

In some embodiments, $L^2$ is HO—$CH_2$—C*H—$CH_2$—C(O)NH—, wherein the asterisk denotes attachment point. In some embodiments, Z is $OCF_3$. In some embodiments, Y is chlorine. In some embodiments, Y is chlorine located para to $L^2$.

The invention also relates to the stereoisomers, enantiomers, mixtures thereof and salts thereof, of the compounds of general Formulae (Ia), (Ib), (Ic), and (Id), according to the invention. Table 1 provides non-limiting examples of compounds of general Formula (I). It includes the following compounds: N-(4-chlorophenyl)-4-hydroxy-3-(4-(4-(trifluoromethoxy)phenyl)-piperazin-1-yl)butanamide (Formula 1); 1-(4-chlorophenyl)-3-(4-(4-(trifluoromethoxy)phenyl)piperazin-1-yl)pyrrolidine-2,5-dione (Formula 2); (1-(naphthalen-2-ylmethyl)-4-(phenylamino)piperidine-4-carbonyl)glycine (Formula 3); 1-(4-chlorophenyl)-3-(4-(4-(trifluoromethoxy)phenyl)piperazin-1-yl)pyrrolidin-2-one (Formula 4); 1-(4-chlorophenyl)-5-thioxo-3-(4-(4-(trifluoro-methoxy)phenyl)piperazin-1-yl) pyrrolidin-2-one (Formula 5); 1-(4-chlorophenyl)-5-methoxy-4-(4-((4-(trifluoromethoxy)phenyl)amino) piperidin-1-yl)pyrrolidin-2-one (Formula 6); 1-(4-chlorophenyl)-5-thioxo-4-(4-((4-(trifluoromethoxy)phenyl)amino)piperidin-1 yl)pyrrolidin-2-one (Formula 7); 4-(4-chlorophenyl)-4-oxo-3-(4-(4-(trifluoromethoxy)phenyl)piperazin-1-yl)butanamide (Formula 8); and N-(4 chlorophenyl)-4-hydroxy-N-methyl-3-(4-(4-(trifluoro-methoxy)phenyl) piperazin-1-yl)butanamide (Formula 9).

TABLE 1

Examples of compounds of general Formula (I)

| Formula # | Structure | Description—according to general Formula (I) |
| --- | --- | --- |
| 1 | 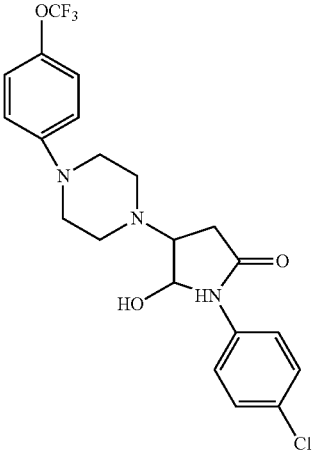 [SMILES: O=C1CC(N2CCN(c3ccc(OC(F)(F)F)cc3)CC2)C(O)N1c1ccc(Cl)cc1] | A is nitrogen (N), $R^3$ is absent, $L^1$ is absent, $R^1$ is phenyl substituted with one trifluoromethoxy located para to a nitrogen (N) of the piperazine ring, $L^2$ is 4-hydroxybutanamidylene, the $3^{rd}$ carbon (C) of the butanamide moiety is bonded to a nitrogen (N) of the piperazine ring, the nitrogen (N) of the butanamide moiety is bonded to $R^2$ and $R^2$ is a phenyl substituted with chlorine positioned para to the nitrogen (N) of the butanamide moiety [also identified herein as VBIT-4 or as BGD-4] |
| 2 | 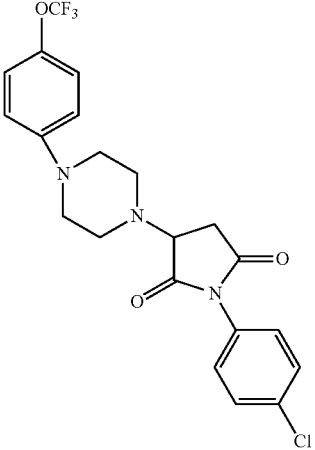 [SMILES: O=C1CC(N2CCN(c3ccc(OC(F)(F)F)cc3)CC2)C(=O)N1c1ccc(Cl)cc1] | A is nitrogen (N), $R^3$ is absent, $L^1$ is absent, $R^1$ is phenyl substituted with one trifluoromethoxy located para to a nitrogen (N) of the piperazine ring, $L^2$ is pyrrolidine-2,5-dione, the carbon (C) at position 3 of the pyrrolidine-2,5-dione moiety is bonded to a nitrogen (N) of the piperazine ring, the nitrogen (N) of the pyrrolidine-2,5-dione moiety is bonded to $R^2$ and $R^2$ is a phenyl substituted with chlorine positioned para to the nitrogen (N) of the pyrrolidine-2,5-dione moiety [also identified herein as VBIT-3 or as BGD-3] |
| 3 | 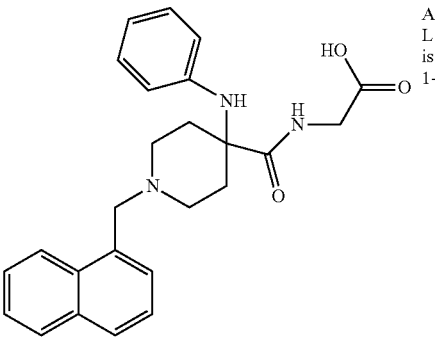 | A is carbon (C), $R^3$ is —C(O)NHCH$_2$C(O)OH group; $L^1$ is —NH—, $R^1$ is a phenyl, $L^2$ is methylene and $R^2$ is a 1-naphthyl [also identified herein as VBIT-12] |

TABLE 1-continued

Examples of compounds of general Formula (I)

| Formula # | Structure | Description—according to general Formula (I) |
|---|---|---|
| 4 | 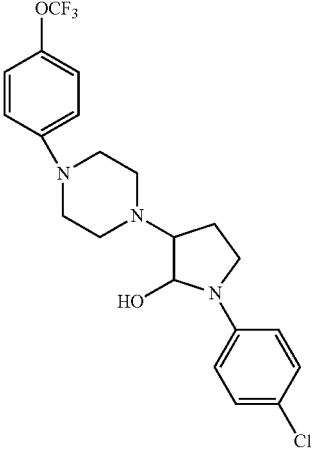 [SMILES: OC1C(N2CCN(c3ccc(OC(F)(F)F)cc3)CC2)CCN1c1ccc(Cl)cc1] | A is nitrogen (N), $R^3$ is absent, $L^1$ is absent, $R^1$ is a phenyl substituted with one trifluoromethoxy located para to a nitrogen (N) of the piperazine ring; $L^2$ is 2-pyrrolidone, the carbon (C) at position 3 of the pyrrolidone moiety is bonded to a nitrogen (N) of the piperazine ring, the nitrogen (N) of the pyrrolidone moiety is bonded to $R^2$ and $R^2$ is a phenyl substituted with chlorine positioned para to the nitrogen (N) of the pyrrolidone moiety [also identified herein as VBIT-5] |
| 5 | 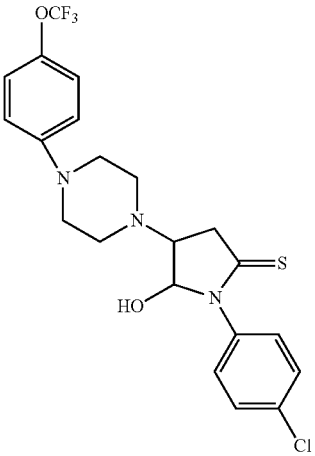 [SMILES: OC1C(N2CCN(c3ccc(OC(F)(F)F)cc3)CC2)CC(=S)N1c1ccc(Cl)cc1] | A is nitrogen (N), $R^3$ is absent, $L^1$ is absent, $R^1$ is a phenyl substituted with one trifluoromethoxy located para to a nitrogen (N) of the piperazine ring, $L^2$ is 5-thioxo-2-pyrrolidone, the carbon (C) at position 3 of the 5-thioxo-2-pyrrolidone moiety is bonded to a nitrogen (N) of the piperazine ring, the nitrogen (N) of the 5-thioxo-2-pyrrolidone moiety is bonded to $R^2$ and $R^2$ is a phenyl substituted with chlorine positioned para to the nitrogen (N) of the 5-thioxo-2-pyrrolidone moiety [also identified herein as VBIT-6] |
| 6 | 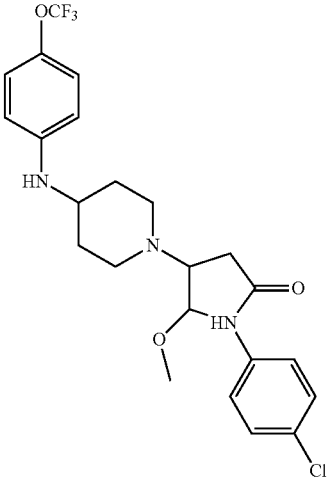 [SMILES: COC1C(N2CCC(Nc3ccc(OC(F)(F)F)cc3)CC2)CC(=O)N1c1ccc(Cl)cc1] | A is carbon (C), $R^3$ is hydrogen, $L^1$ is —NH—, $R^1$ is a phenyl substituted with one trifluoromethoxy located para to $L^1$, $L^2$ is 5-methoxy-2-pyrrolidinone, the carbon (C) at position 3 of the 5-methoxy-2-pyrrolidinone moiety is bonded to the nitrogen (N) of the piperidine ring, the nitrogen (N) of the 5-methoxy-2-pyrrolidinone moiety is bonded to $R^2$ and $R^2$ is a phenyl substituted with chlorine positioned para to the nitrogen (N) of the 5-methoxy-2-pyrrolidinone moiety [also identified herein as VBIT-9] |

TABLE 1-continued

Examples of compounds of general Formula (I)

| Formula # | Structure | Description—according to general Formula (I) |
|---|---|---|
| 7 | 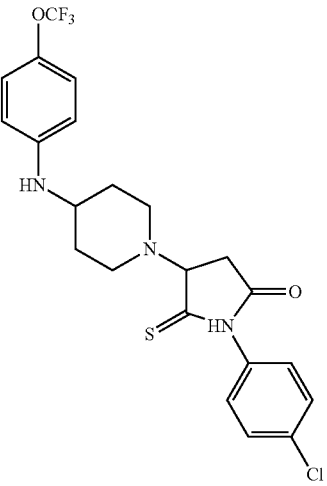 [SMILES: O=C1CC(N2CCC(Nc3ccc(OC(F)(F)F)cc3)CC2)C(=S)N1c1ccc(Cl)cc1] | A is carbon (C), $R^3$ is hydrogen, $L^1$ is —NH—, $R^1$ is a phenyl substituted with one trifluoromethoxy located para to $L^1$, $L^2$ is 5-thioxo-2-pyrrolidone, the carbon (C) at position 3 of the 5-thioxo-2-pyrrolidone moiety is bonded to the nitrogen (N) of the piperidine ring, the nitrogen (N) of the 5-thioxo-2-pyrrolidone moiety is bonded to $R^2$ and $R^2$ is a phenyl substituted with chlorine positioned para to the nitrogen (N) of the 5-thioxo-2-pyrrolidone moiety [also identified herein as VBIT-10] |
| 8 | 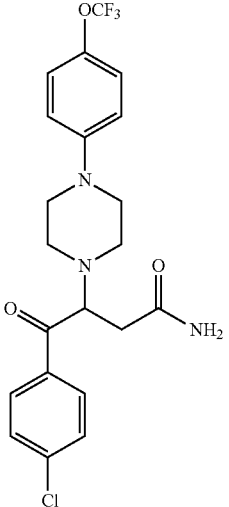 [SMILES: NC(=O)CC(C(=O)c1ccc(Cl)cc1)N1CCN(c2ccc(OC(F)(F)F)cc2)CC1] | A is nitrogen (N), $R^3$ is absent, $L^1$ is absent, $R^1$ is phenyl substituted with one trifluoromethxoy located para to a nitrogen (N) of the piperazine ring, $L^2$ is 4-oxobutanamide, the $3^{rd}$ carbon (C) of the butanamide moiety is bonded to a nitrogen (N) of the piperazine ring, the $4^{th}$ carbon (C) of the butanamide moiety is bonded to $R^2$ and $R^2$ is a phenyl substituted with chlorine positioned para to the $4^{th}$ carbon (C) of the butanamide moiety [also identified herein as VBIT-7] |
| 9 | 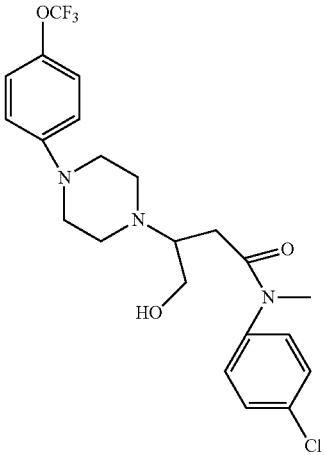 [SMILES: CN(C(=O)CC(CO)N1CCN(c2ccc(OC(F)(F)F)cc2)CC1)c1ccc(Cl)cc1] | A is nitrogen (N), $R^3$ is absent, $L^1$ is absent, $R^1$ is phenyl substituted with one trifluoromethoxy located para to a nitrogen (N) of the piperazine ring, $L^2$ is 4-hydroxy-N-methylbutanamide, the $3^{rd}$ carbon (C) of the butanamide moiety is bonded to a nitrogen (N) of the piperazine ring, the nitrogen (N) of the butanamide moiety is bonded to $R^2$ and $R^2$ is a phenyl substituted with chlorine positioned para to the nitrogen (N) of the butanamide moiety [also identified herein as VBIT-8] |

In some embodiments, the piperazine- or piperidine derivative, also designated herein substituted N-heterocycle, is represented by a formula selected from Formula #1 (VBIT-4), Formula #2 (VBIT-3), Formula #3 (VBIT-12), Formula #4 (VBIT-5), Formula #5 (VBIT-6), Formula #6 (VBIT-9), Formula #7 (VBIT-10), Formula #8 (VBIT-7) or Formula #9 (VBIT-8) or enantiomers, diastereomers, mixtures or salts thereof. In some embodiments, the substituted N-heterocycle is selected from VBIT-4, VBIT-3, VBIT-12, VBIT-5, VBIT-6, VBIT-9, VBIT-10, VBIT-7 or VBIT-8 or enantiomers, diastereomers, mixtures or salts thereof. Each possibility represents a separate embodiment. In some embodiments, the substituted N-heterocycle is selected from VBIT-4, VBIT-3 or VBIT-12 or enantiomers, diastereomers, mixtures or salts thereof. In some embodiments, the substituted N-heterocycle is selected from VBIT-4 or VBIT-12 or enantiomers, diastereomers, mixtures or salts thereof. In some embodiments, the substituted N-heterocycle is selected from VBIT-4 or VBIT-3 or enantiomers, diastereomers, mixtures or salts thereof. In some embodiments, the substituted N-heterocycle is VBIT-4 or enantiomers, diastereomers, or salts thereof. In some embodiments, the substituted N-heterocycle is VBIT-12 or enantiomers, diastereomers, or salts thereof. In some embodiments, the substituted N-heterocycle is VBIT-3 or enantiomers, diastereomers, or salts thereof.

Some terms used herein to describe the compounds according to the invention are defined more specifically below.

The term "N-heterocycle", and "nitrogen-heterocycle" are interchangeable and denote heterocyclic compounds having from 5 through 7 ring atoms, at least one of which is nitrogen. N-heterocycles encompass, inter alia, piperidine and piperazine.

The term "halogen" denotes an atom selected from among F, Cl, Br and I, preferably Cl and Br.

The term "heteroalkyl" as used herein in reference to $R^3$ moiety of the general Formulae (I), (Ia), (Ib), (Ic), (Id), and (IIa), refers to a saturated or unsaturated group of 3-12 atoms (apart from hydrogen atoms), wherein one or more (preferably 1, 2 or 3) atoms are a nitrogen, oxygen, or sulfur atom, for example an alkyloxy group, as for example methoxy or ethoxy, or a methoxymethyl-, nitrile-, methylcarboxyalkylester- or 2,3-dioxyethyl-group; preferably heteroalkyl group is a chain comprising an alkylene, and at least one of a carboxylic acid moiety, a carbonyl moiety, an amine moiety, a hydroxyl moiety, an ester moiety, an amide moiety. The term heteroalkyl refers furthermore to a carboxylic acid or a group derived from a carboxylic acid as for example acyl, acyloxy, carboxyalkyl, carboxyalkylester, such as for example methylcarboxyalkylester, carboxyalkylamide, alkoxycarbonyl or alkoxycarbonyloxy; preferably the term refers to —C(O)NHCH$_2$C(O)OH group.

The term "$C_{1-n}$-alkyl", wherein n may have a value as defined herein, denotes a saturated, branched or unbranched hydrocarbon group with 1 to n carbon (C) atoms. Examples of such groups include methyl, ethyl, n-propyl, iso-propyl, butyl, iso-butyl, sec-butyl, tert-butyl, n-pentyl, iso-pentyl, neo-pentyl, tert-pentyl, n-hexyl, iso-hexyl, etc.

The term "$C_{1-4}$-alkyl" denotes a saturated, branched or unbranched hydrocarbon group with 1 to 4 carbon (C) atoms.

The term "$C_{1-n}$-alkoxy", wherein n may have a value as defined herein, denotes an alkyl group as defined herein, bonded via —O— (oxygen) linker.

The term "$C_{1-n}$ alkylene", wherein n may have a value as defined herein, denotes an alkylene group of saturated hydrocarbons substituents with the general formula $C_nH_{2n}$. Generally, n is a positive integer. For example, $C_1$ alkylene refers to methylene (—CH$_2$—), $C_3$ alkylene refers to $C_3H_6$, which may be n-propylene (—CH$_2$CH$_2$CH$_2$—) or isopropylene (—CH(CH$_3$)CH$_2$— or —CH$_2$CH(CH$_3$)—). Preferably the term refers to an unbranched n-alkylene.

The term "$C_{1-n}$-perfluoroalkoxy", wherein n may have a value as defined herein, denotes an alkoxy group with hydrogen atoms substituted by fluorine atoms.

The term "$C_{1-m}$-alkylamidyl", wherein m may have a value as defined herein, denotes a group comprising 1 to m carbon (C) atoms and an amide group formed by either $C_{m-a}$alkyl-COOH and H$_2$N—$C_a$alkyl, or $C_{m-a}$alkyl-NH$_2$ and HOOC—$C_a$alkyl, wherein a is smaller than or equal to m. Similarly, the terms $C_4$-alkylamidylene, $C_5$-alkylamidylene and $C_6$-alkylamidylene refer to divalent $C_m$-alkylamidyl groups, wherein m is either 4, 5, or 6, respectively.

Compounds of general Formulae (I), (Ia), (Ib), (Ic), and (Id) may be prepared according to methods known in the art (see, for example, WO 2018/116307 and US 2018/0078548, the content of which is incorporated by reference as if fully set forth herein).

The invention also relates to the stereoisomers, such as diastereomers and enantiomers, mixtures and salts, particularly the physiologically acceptable salts, of the compounds of general Formulae (I), (Ia), (Ib), (Ic), and (Id), and of the compounds of structural formulae 1, 2, 3, 4, 5, 6, 7, 8 and 9.

The compounds of general Formulae (I), (Ia), (Ib), (Ic), and (Id), or intermediate products in the synthesis of compounds of general Formulae (I), (Ia), (Ib), (Ic), and (Id), may be resolved into their enantiomers and/or diastereomers on the basis of their physical-chemical differences using methods known in the art. For example, cis/trans mixtures may be resolved into their cis and trans isomers by chromatography. For example, enantiomers may be separated by chromatography on chiral phases or by recrystallisation from an optically active solvent or by enantiomer-enriched seeding.

The compounds of general Formulae (I), (Ia), (Ib), (Ic), and (Id), and the compounds of structural formulae 1, 2, 3, 4, 5, 6, 7, 8 and 9, may be converted into the salts thereof, particularly physiologically acceptable salts for pharmaceutical use. Suitable salts of the compounds of general Formulae (I), (Ia), (Ib), (Ic), and (Id), and of the compounds of structural formulae 1, 2, 3, 4, 5, 6, 7, 8 and 9, may be formed with organic or inorganic acids including, but not limited to, hydrochloric acid, hydrobromic acid, sulfuric acid, phosphoric acid, lactic acid, acetic acid, succinic acid, citric acid, palmitic acid or maleic acid. Compounds of general Formulae (I), (Ia), (Ib), (Ic) and (Id), containing a carboxy group, may be converted into the salts thereof, particularly into physiologically acceptable salts for pharmaceutical use, with organic or inorganic bases. Suitable bases for this purpose include, for example, sodium hydroxide, potassium hydroxide, ammonium hydroxide, arginine or ethanolamine.

According to certain embodiments, the compound is of general Formula (IIa):

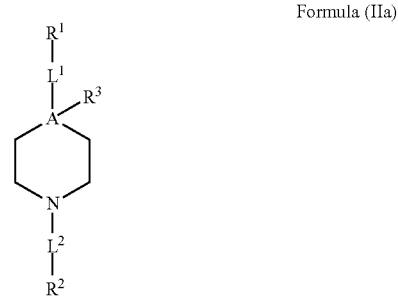

Formula (IIa)

wherein: A is carbon (C); $R^3$ is a hydrogen, an unsubstituted or substituted amide or a heteroalkyl group comprising 3-12 atoms apart from hydrogen atoms, wherein at least one of said 3-12 atoms is a heteroatom, selected from nitrogen, sulfur and oxygen; L¹ is an amino linking group —NR⁴—, wherein R⁴ is hydrogen, a $C_{1-5}$-alkyl, a $C_{1-5}$-alkylene or a substituted alkyl —CH₂R, wherein R is a functional group selected from hydrogen, halo, haloalkyl, cyano, nitro, hydroxyl, alkyl, alkenyl, aryl, alkoxyl, aryloxyl, aralkoxyl, alkylcarbamido, arylcarbamido, amino, alkylamino, arylamino, dialkylamino, diarylamino, arylalkylamino, aminocarbonyl, alkylaminocarbonyl, arylaminocarbonyl, alkylcarbonyloxy, arylcarbonyloxy, carboxyl, alkoxycarbonyl, aryloxycarbonyl, sulfo, alkylsulfonylamido, alkyl sulfonyl, aryl sulfonyl, alkylsulfinyl, arylsulfinyl or heteroaryl; when R³ is hydrogen, then L¹ is preferably —NH—; when R³ is heteroalkyl group comprising 3-12 atoms, then L¹ is preferably —NC$_n$H$_{2n}$—, such that it forms a ring with R³; R¹ is an aromatic moiety, which is optionally substituted with one or more of $C_{1-2}$-alkoxy, e.g. haloalkoxy, such as $C_{1-2}$-perfluoroalkoxy; L² is a linking group comprising 4-10 atoms (apart from hydrogen atoms), optionally forming a ring, whereof at least one of the atoms is nitrogen, said nitrogen forming part of an amide group or L² is $C_{1-5}$ alkyl or $C_{1-5}$ alkylene; said linking group L² bonds piperidine or piperazine moiety at nitrogen (N) atom; preferably, L² is selected from butanamidylene, N-methylbutanamidylene, N,N-dimethylbutanamidylene, 4-hydroxybutanamidylene, 4-oxobutanamidylene, 4-hydroxy-N-methylbutanamidylene, 4-oxo-N-methylbutanamidylene, 2-pyrrolidonylene, pyrrolidine-2,5-dionylene, 5-thioxo-2-pyrrolidinonylene and 5-methoxy-2-pyrrolidinonylene; and R² is an aryl, optionally substituted with halogen, optionally when R² is a phenyl it is substituted with halogen, further optionally when R² is naphthyl, L² is an alkylenyl group. In a specific embodiment, R³ is hydrogen, L¹ is —NH—, and R¹ is a phenyl substituted with trifluoromethoxy. The invention also relates to use of the stereoisomers, enantiomers, mixtures thereof, and salts, particularly the physiologically acceptable salts, of the compounds of general Formula (I) and (IIa). In some embodiments, A is carbon (C), R³ is hydrogen (H), L¹ is a NH group, R¹ is a phenyl substituted with one trifluoromethoxy, L² is pyrrolidine-2,5-dione, and R² is a phenyl substituted with a chlorine at the para position.

In some embodiments, A is carbon (C), R³ is a C(O) NCH₂C(O)OH group and is connected to both A and L¹, L¹ is a NCH₂ group and is connected to both 10 and R³, 10 is a phenyl, L² is methylene C¹ alkylene and R² is a naphthyl.

According to certain embodiments, methods of the present invention comprise administering to the subject at least one compound according to the general Formula (IIa), having a structural Formulae selected from Formula 10 and Formula 11:

Formula 10

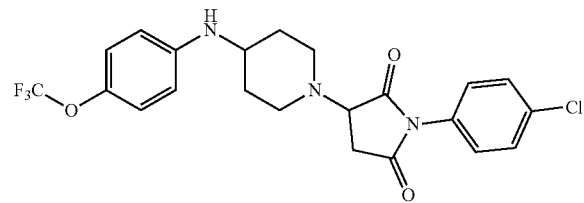

The compound of Formula 10 is also identified herein as AKOS022 or AKOS022075291.

Formula 11

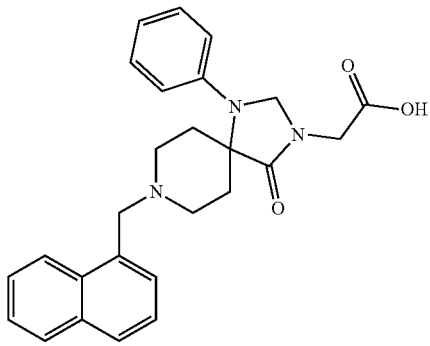

The compound of Formula 11 is also identified herein as DIV 00781.

The compounds of general Formula (IIa) such as, without being limited to, the compounds of structural formulae 10 and 11, may be converted into the salts thereof, particularly physiologically acceptable salts for pharmaceutical use. Suitable salts of the compounds of general Formulae (IIa) include, but not limited to, the compounds of structural formulae 10 and 11, may be formed with organic or inorganic acids, such as, without being limited to hydrochloric acid, hydrobromic acid, sulfuric acid, phosphoric acid, lactic acid, acetic acid, succinic acid, citric acid, palmitic acid or maleic acid. Compounds of general Formula (IIa) containing a carboxy group, may be converted into the salts thereof, particularly into physiologically acceptable salts for pharmaceutical use, with organic or inorganic bases. Suitable bases for this purpose include, for example, sodium salts, potassium salts, arginine salts, ammonium salts, or ethanolamine salts.

Peptides

The present invention is further based in part on the unexpected discovery that the N-terminus domain of VDAC1 is required for mtDNA interaction with VDAC1. The N-terminal domain contains three positively-charged residues (K12, R15, K20) that could interact with the negatively-charged backbone of mtDNA. Indeed, ISG expression was significantly reduced in mouse embryonic fibroblasts (MEFs) expressing either the VDAC1 mutated in the N-terminus or N-terminus truncated protein (ΔN-VDAC1), compared with those expressing WT VDAC1, indicating the importance of the N-terminal domain both in interacting with mtDNA and activating the cGAS pathway.

According to some embodiments, the VDAC inhibitor is a peptide derived from or corresponding to amino acids residues 1-26 of human VDAC1 N-terminal domain (SEQ ID NO:1) and comprising: (a) one or more mutations compared to the SEQ ID NO:1; (b) a truncation of at least 1 amino acid compared to SEQ ID NO:1; or any combination thereof, and wherein the mutated, truncated, or both, VDAC inhibiting peptide is devoid of pro-apoptotic activity.

In some embodiments, the VDAC inhibiting peptide does not induce, initiate, propagates, or any equivalent thereof, apoptosis. In some embodiments, the VDAC inhibiting peptide comprises at least 1 mutation wherein the mutation renders the peptide anti-apoptotic or non-pro-apoptotic.

It is to be understood that the present invention encompasses peptides having any length between 1-25 amino acids derived from or corresponding to amino acids residues 1-26 of human VDAC1 N-terminal domain, e.g., at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, at least 25 amino acids derived from or corresponding to amino acids residues 1-26 of human VDAC1 N-terminal domain.

According to certain embodiments, the peptide comprises 8 amino acids. According to other embodiments, the peptide comprises 12 amino acids. According to additional embodiments, the peptide comprises 16 amino acids. According to further embodiments, the peptide comprises 22 amino acids.

According to some embodiments, the VDAC inhibitor is a peptide of 1-25 amino acids comprising a contiguous sequence derived from amino acids residues 1-26 of human VDAC1 N-terminal domain. In some embodiments, the VDAC inhibiting peptide comprises less amino acids compared to SEQ ID NO:1. In some embodiments, the VDAC inhibiting peptide is a truncated form of SEQ ID NO:1. In some embodiments, the VDAC inhibiting peptide comprises one or more mutations and a truncation of at least 2 amino acids, compared to SEQ ID NO:1. In some embodiments, the VDAC inhibiting peptide comprises at least 2, at least 3, at least 4, or at least 5 mutations, or any value and range therebetween. Each possibility represents a separate embodiment of the invention. In some embodiments, the VDAC inhibiting peptide comprises 1-2, 1-3, 1-4, 1-5, 2-3, 2-4, 2-5, 3-4, 3-5, or 4-5 mutations, compared to SEQ ID NO:1. Each possibility represents a separate embodiment of the invention. In some embodiments, the mutation is located in the last 5 amino acids of the C'-terminal end of the VDAC inhibiting peptide. In some embodiments, the mutation is located in the GXXXG motif (SEQ ID NO:3) at the C-terminal end of the inhibiting peptide. In some embodiments, the truncation is an omission or deletion of at least 1, at least 2, at least 3, at least 4, or at least 5 amino acids, at the C'-terminal end of the VDAC inhibiting peptide, or any value and range therebetween. Each possibility represents a separate embodiment of the invention. In some embodiments, the truncation is an omission or deletion of 1-2, 1-3, 1-4, 1-5, 2-3, 2-4, 2-5, 3-4, 3-5, or 4-5 amino acids at the C'-terminal end of the VDAC inhibiting peptide. Each possibility represents a separate embodiment of the invention. In some embodiments the truncation is a complete or partial omission or deletion of the GXXXG motif (SEQ ID NO:3) at the C-terminal end of the inhibiting peptide. As used herein, "complete" is 100%, e.g., all 5 amino acids of the GXXXG motif are absent from the VDAC inhibiting peptide. As used herein, partially comprises 1-2, 1-3, 1-4, 2-3, 2-4, or 3-4 amino acids of the GXXXG motif are absent from the VDAC inhibiting peptide.

In some embodiments, the VDAC inhibiting peptide comprises or consists of the amino acid sequence: MAVPPTYADLGKSARDVFTKXYXFX (SEQ ID NO:2), wherein X is any amino acid other than glycine. In some embodiments, the VDAC inhibiting peptide comprises or consisting of an amino acid sequence selected from SEQ ID NO:4; SEQ ID NO:5; SEQ ID NO:6; SEQ ID NO:7; or SEQ ID NO:8.

In some embodiments, the VDAC inhibiting peptide comprises or consists of an amino acid sequence selected from SEQ ID:9; SEQ ID:10; SEQ ID:11; SEQ ID:12; or SEQ ID:13.

In one embodiment the peptide of the invention comprises an amino acid sequence that modulates the interaction between VDAC1 and mtDNA. As used herein, the term "modulates" encompasses both "increase" and "increases", or "decrease" and "decreases".

It is yet another object of the present invention to provide short peptides based on the sequence of VDAC1 N-terminal domain and conjugates thereof comprising peptidomimetic compounds having further improved stability and cell permeability properties. Non-limiting examples of such compounds include N-alkylation of selected peptide residues, side-chain modifications of selected peptide residues, non-natural amino acids, use of carbamate, urea, sulfonamide and hydrazine for peptide bond replacement, and incorporation of non-peptide moieties including but not limited to piperidine, piperazine and pyrrolidine, through a peptide or non-peptide bond. Modified bonds between amino acid residues in peptidomimetics according to the present invention may be selected from: an amide, urea, carbamate, hydrazine or sulfonamide bond. Unless explicitly stated otherwise the bonds between the amino acid residues are all amide bonds.

Stability to enzymatic degradation is an important factor in designing a synthetic peptide to be used as a therapeutic agent. The D-stereoisomers of amino acids are known to be more stable to such degradation.

Thus, according to certain embodiments, the peptide of the invention is a L-stereomeric peptide, comprising only L-amino acids. According to other embodiments, the peptide is D-L stereomeric peptide, comprising a combination of D- and L-amino acids. According to yet additional embodiments, the peptide is D-stereomeric peptide, comprising only D-amino acids.

According to certain embodiments, the peptide based on the VDAC1 N-terminal domain is conjugated to a permeability-enhancing moiety covalently connected to the peptide via a direct bond or via a linker, to form a peptide conjugate.

The permeability-enhancing moiety according to the present invention may be connected to the C-terminus free group of the active peptide. The moiety may be linked directly to the peptide or through a linker or a spacer.

Any moiety known in the art to facilitate permeability actively or passively or enhance permeability of the compound into cells may be used for conjugation with the peptide core according to the present invention. Non-limiting examples include: hydrophobic moieties such as fatty acids, steroids and bulky aromatic or aliphatic compounds; moieties which may have cell-membrane receptors or carriers, such as steroids, vitamins and sugars, natural and non-natural amino acids, liposomes, nano-particles and transporter peptides. According to certain embodiments, the permeability-enhancing moiety is a cell penetrating peptide (CPP). In one exemplary embodiment the CPP is an amino acid sequence comprising the *Drosophila* antennapedia (ANTP) domain or a fragment thereof. In certain embodiments, the ANTP domain comprises the amino acid sequence as set forth in SEQ ID NO:14. According to these embodiments, the peptide conjugate comprises an amino acid sequence selected from SEQ ID:14 contiguously proceed by any one of: SEQ IN Nos: 2, and 4-13.

According to additional exemplary embodiments, the CPP comprises a fragment of the TfR domain recognized by the human transferrin receptor (Tf) having the amino acid sequence set forth in SEQ ID NO: 15 or SEQ ID NO:16. Each possibility represents a separate embodiment of the present invention. Other CPPs known in the art as TAT can also be used.

Silencing Oligonucleotides

According to some embodiments, the VDAC inhibitor is a VDAC1-silencing oligonucleotide molecule, or a construct comprising same. Any VDAC1-silencing oligonucleotide molecule may be used in the methods of the present invention, as long as the oligonucleotide comprises at least 15 contiguous nucleic acids identical to SEQ ID NO:17, to an mRNA molecule encoded by same or to a sequence complementary thereto.

In some embodiments, the VDAC1-silencing oligonucleotide is at least 14 contiguous nucleic acids identical to SEQ ID NO:17, at least 15 contiguous nucleic acids identical to SEQ ID NO:17, at least 16 contiguous nucleic acids identical to SEQ ID NO:17, at least 17 contiguous nucleic acids identical to SEQ ID NO:17, at least 18 contiguous nucleic acids identical to SEQ ID NO:17, at least 19 contiguous nucleic acids identical to SEQ ID NO:17, at least 20 contiguous nucleic acids identical to SEQ ID NO:17, at least 21 contiguous nucleic acids identical to SEQ ID NO:17, at least 22 contiguous nucleic acids identical to SEQ ID NO:17, at least 23 contiguous nucleic acids identical to SEQ ID NO:17, at least 24 contiguous nucleic acids identical to SEQ ID NO:17, at least 25 contiguous nucleic acids identical to SEQ ID NO:17, at least 26 contiguous nucleic acids identical to SEQ ID NO:17, at least 27 contiguous nucleic acids identical to SEQ ID NO:17, at least 28 contiguous nucleic acids identical to SEQ ID NO:17, at least 29 contiguous nucleic acids identical to SEQ ID NO:17, or at least 30 contiguous nucleic acids identical to SEQ ID NO:17, or any value and range therebetween. Each possibility represents a separate embodiments of the invention. In some embodiments, the VDAC1-silencing oligonucleotide is 14 to 30 contiguous nucleic acids identical to SEQ ID NO:17, 15 to 28 contiguous nucleic acids identical to SEQ ID NO:17, 16 to 29 contiguous nucleic acids identical to SEQ ID NO:17, 22 to 26 contiguous nucleic acids identical to SEQ ID NO:17, 17 to 25 contiguous nucleic acids identical to SEQ ID NO:17, 16 to 24 contiguous nucleic acids identical to SEQ ID NO:17, 24 to 30 contiguous nucleic acids identical to SEQ ID NO:17, 16 to 23 contiguous nucleic acids identical to SEQ ID NO:17, or 18 to 26 contiguous nucleic acids identical to SEQ ID NO:17. Each possibility represents a separate embodiment of the invention.

According to certain embodiments, the VDAC1-silencing oligonucleotide comprises a nucleic acid sequence selected from SEQ ID NO:18; SEQ ID NO:19; SEQ ID NO:20; SEQ ID NO:21; SEQ ID NO:22; SEQ ID NO:23; SEQ ID NO:24; SEQ ID NO:25, SEQ ID NO:26, SEQ ID NO:27, SEQ ID NO:28, or a complementary sequence thereto.

According to certain embodiments, the VDAC1-silencing oligonucleotide is a RNA interference (RNAi) molecule or an antisense molecule. According to some embodiments, the RNAi molecule is an unmodified and/or modified double stranded (ds) RNA molecules including, but not limited to, short-temporal RNA (stRNA), small interfering RNA (siRNA), short-hairpin RNA (shRNA), and microRNA (miRNA).

According to certain exemplary embodiments, the RNAi is siRNA. According to some exemplary embodiments, the siRNA comprises a first oligonucleotide sequence identical to at least 15 nucleotides of SEQ ID NO:17 or to a mRNA encoded by same and a second oligonucleotide sequence substantially complementary to the first oligonucleotide; wherein said first and second oligonucleotide sequences are annealed to each other to form the siRNA molecule.

According to some embodiments, the siRNA is a single-stranded short hairpin RNA (shRNA) wherein the first oligonucleotide sequence is separated from the second oligonucleotide sequence by a linker which forms a loop structure upon annealing of the first and second oligonucleotide sequences. In some embodiments the linker is about 3 to about 60 nucleotides.

According to some exemplary embodiments, the siRNA comprises a first oligonucleotide having the nucleic acid sequence set forth in SEQ ID NO:18 and a second oligonucleotide having the nucleic acid sequence set forth in SEQ ID NO:31.

According to some exemplary embodiments, the siRNA comprises a first oligonucleotide having the nucleic acid sequence set forth in SEQ ID NO:19 and a second oligonucleotide having the nucleic acid sequence set forth in SEQ ID NO:26.

According to some exemplary embodiments, the siRNA comprises a first oligonucleotide having the nucleic acid sequence set forth in SEQ ID NO:20 and a second oligonucleotide having the nucleic acid sequence set forth in SEQ ID NO:27.

According to some exemplary embodiments, the siRNA comprises a first oligonucleotide having the nucleic acid sequence set forth in SEQ ID NO:25 and a second oligonucleotide having the nucleic acid sequence set forth in SEQ ID NO:28.

According to additional embodiments, at least one of the siRNA nucleic acids is chemically modified. Typically, the modification is 2'-O-methyl modification of a guanine or uracil. According to certain embodiments, the first and the second polynucleotide of the RNAi comprise several chemically modified guanine and/or uracil nucleotides.

According to certain exemplary embodiments, the modified siRNA molecule comprises a first oligonucleotide having the nucleic acid sequence set forth in SEQ ID NO:29 and a second oligonucleotide having the nucleic acid sequence set forth in SEQ ID NO:30.

According to certain exemplary embodiments, the modified siRNA molecule comprises a first oligonucleotide having the nucleic acid sequence set forth in SEQ ID NO:32, and a second oligonucleotide having the nucleic acid sequence set forth in SEQ ID NO:33.

According to certain embodiments, the method comprises administering to the subject a construct capable of expressing in cells of said subject a therapeutically effective amount of at least one VDAC1-silencing oligonucleotide. According to some embodiments, the method comprises administering to the subject a construct capable of expressing at least one oligonucleotide comprising a nucleic acid sequence selected from the group consisting of SEQ ID Nos:18-25. According to some embodiments, the method comprises administering to the subject a construct capable of expressing siRNA molecule comprising the nucleic acid sequence set forth in any one of SEQ ID Nos:26-28, and 31. According to certain exemplary embodiments, the method comprises administrating to the subject a construct capable of expressing siRNA oligonucleotide comprises a first oligonucleotide having the nucleic acid sequence set forth in SEQ ID NO:18 and a second oligonucleotide having the nucleic acid sequence set forth in SEQ ID NO:31. According to certain exemplary embodiments, the method comprises administrating to the subject a construct capable of expressing siRNA oligonucleotide comprises a first oligonucleotide having the nucleic acid sequence set forth in SEQ ID NO:29 and a second oligonucleotide having the nucleic acid sequence set forth in SEQ ID NO:30.

The silencing oligonucleotide molecules designed according to the teachings of the present invention can be generated according to any nucleic acid synthesis method known in the art, including both enzymatic syntheses and solid-phase syntheses. Any other means for such synthesis may also be employed; the actual synthesis of the nucleic acid agents is well within the capabilities of one skilled in the art and can be accomplished via established methodologies as detailed in, for example: Sambrook, J. and Russell, D. W. (2001), "Molecular Cloning: A Laboratory Manual"; Ausubel, R. M. et al., eds. (1994, 1989), "Current Protocols in Molecular Biology," Volumes I-III, John Wiley & Sons, Baltimore, Maryland; Perbal, B. (1988), "A Practical Guide to Molecular Cloning," John Wiley & Sons, New York; and Gait, M. J., ed. (1984), "Oligonucleotide Synthesis"; utilizing solid-phase chemistry, e.g. cyanoethyl phosphoramidite followed by deprotection, desalting, and purification by, for example, an automated trityl-on method or HPLC.

It will be appreciated that nucleic acid agents of the present invention can be also generated using an expression vector as is further described herein below.

In some embodiments, the VDAC inhibiting compound reduces rates of mtDNA release from the mitochondria to the cytosol. In some embodiments, the VDAC inhibiting compound reduces the levels of mtDNA/fragments in the cytosol (e.g., cmtDNA). In some embodiments, the VDAC inhibiting compound maintains the levels of mtDNA/fragments in the mitochondria. In some embodiments, the VDAC inhibiting compound reduces the levels of VDAC oligomerization. In some embodiments, the VDAC inhibiting compound reduces the levels of VDAC mRNA. In some embodiments, the VDAC inhibiting compound reduces the stability of VDAC mRNA. In some embodiments, the VDAC inhibiting compound reduces the levels of the VDAC protein. In some embodiments, the VDAC inhibiting compound reduces the rates of VDAC protein synthesis. In some embodiments, the VDAC inhibiting compound reduces electrical conductance of the VDAC protein. In some embodiments, the VDAC inhibiting compound reduces the levels of type-1 interferon signaling. The terms "inhibit" and "reduce" are used herein interchangeably.

In some embodiments, the term "inhibit" refers to a reduction of at least 5%, at least 15%, at least 25%, at least 40%, at least 50%, at least 70%, at least 85%, at least 95%, at least 97, at least 99%, or 100% compared to control, or any value or range therebetween. In some embodiments, inhibit refers to a reduction of 5-15%, 10-25%, 20-40%, 30-50%, 45-70%, 65-85%, 80-95%, 90-97, 94-99%, or 95-100% compared to control. Each possibility represents a separate embodiment of the invention.

Pharmaceutical Compositions

The present invention provides pharmaceutical compositions comprising one or more compounds of general Formulae (I), (Ia), (Ib), (Ic), (Id), and (IIa), such as, and without being limited to, the compounds of structural formulae 1, 2, 3, 4, 5, 6, 7, 8, 9, 10 and 11, particularly the specific compounds of Formulae 1, 2, 3, 10 and 11, or an enantiomer, diastereomer, mixture or a pharmaceutically acceptable salt thereof, and a pharmaceutically acceptable carrier or diluent, optionally further comprising one or more excipients, for use in treatment of a disease selected from an type-1 interferon-mediated diseases and IBD.

The present invention provides pharmaceutical compositions comprising the herein disclosed VDAC inhibiting peptide, and a pharmaceutically acceptable carrier or diluent, optionally further comprising one or more excipients, for use in treatment of a disease selected from type-1 interferon-mediated diseases, and an IBD disease.

The present invention provides pharmaceutical compositions comprising a VDAC1 silencing oligonucleotide, and a pharmaceutically acceptable carrier or diluent, optionally further comprising one or more excipients, or use in treatment of a disease selected from type-1 interferon-mediated diseases, and an IBD disease.

According to certain embodiments, the VDAC1-silencing oligonucleotide molecules of the present invention, particularly siRNA molecules are encapsulated in a particle suitable for the delivery of the siRNA to the site of action in a subject in need thereof. According to certain embodiments, the siRNA is encapsulated in a Poly(D, L-lactide-co-glycolide) (PLGA) based nanoparticle. According to certain embodiments, the PLGA-based nanoparticle further comprises polyethyleneimine (PEI), designated herein PEI-PLGA nanoparticle.

The present invention further provides a pharmaceutical composition comprising the unmodified and modified VDAC1-silencing oligonucleotides of the invention, a particle comprising same, and one or more pharmaceutically acceptable diluents, carriers or excipients. According to certain embodiment, the composition is formulated for topical, intratumoral, intravenous or pulmonary administration.

The term "pharmaceutically acceptable" means approved by a regulatory agency of the Federal or a state government or listed in the U. S. Pharmacopeia or other generally recognized pharmacopeia for use in animals, and more particularly in humans.

The term "carrier" refers to a diluent, adjuvant, or vehicle with which the therapeutic compound is administered. Such pharmaceutical carriers can be sterile liquids, such as water and oils, including those of petroleum, animal, vegetable or synthetic origin, such as peanut oil, soybean oil, mineral oil, sesame oil and the like, polyethylene glycols, glycerin, propylene glycol or other synthetic solvents.

The compositions can take the form of solutions, suspensions, emulsion, tablets, pills, capsules, powders, patches, gels, creams, ointments, sustained-release formulations, and the like.

The pharmaceutical composition can further comprise pharmaceutical excipients including, but not limited to, wetting agents, emulsifying agents, and pH adjusting agents. Antibacterial agents such as benzyl alcohol or methyl parabens; antioxidants such as ascorbic acid or sodium bisulfite; chelating agents such as ethylenediaminetetraacetic acid; and agents for the adjustment of tonicity such as sodium chloride or dextrose are also envisioned.

For intravenous administration of a therapeutic compound, water is a preferred carrier. Saline solutions and aqueous dextrose and glycerol solutions can also be employed. Buffers can also be used.

Pharmaceutical compositions for parenteral administration can also be formulated as suspensions of the active compounds. Such suspensions may be prepared as oily injection suspensions or aqueous injection suspensions. For oily suspension injections, suitable lipophilic solvents or vehicles can be used including fatty oils such as sesame oil, or synthetic fatty acids esters such as ethyl oleate, triglycerides or liposomes. Aqueous injection suspensions may contain substances which increase the viscosity of the suspension, such as sodium carboxymethyl cellulose, sorbitol or dextran. Optionally, the suspension may also contain suitable stabilizers or agents which increase the solubility of the compounds, to allow for the preparation of highly concentrated solutions.

For transmucosal and transdermal administration, penetrants appropriate to the barrier to be permeated may be used in the formulation. Such penetrants, including for example DMSO or polyethylene glycol, are known in the art.

For oral administration, the compounds can be formulated readily by combining the active compounds with pharmaceutically acceptable carriers and excipients well known in the art. Such carriers enable the compounds of the invention to be formulated as tablets, pills, dragees, capsules, liquids, gels, syrups, slurries, suspensions, and the like, for oral ingestion by a subject. Pharmacological preparations for oral use can be made using a solid excipient, optionally grinding the resulting mixture, and processing the mixture of granules, after adding suitable auxiliaries if desired, to obtain tablets or dragee cores. Suitable excipients are, in particular, fillers such as sugars, including lactose, sucrose, mannitol, or sorbitol; cellulose preparations such as, for example, maize starch, wheat starch, rice starch, potato starch, gelatin, gum tragacanth, methyl cellulose, hydroxypropylmethyl-cellulose, sodium carboxymethylcellulose; and/or physiologically acceptable polymers such as polyvinylpyrrolidone (PVP). If desired, disintegrating agents may be added, such as cross-linked polyvinyl pyrrolidone, agar or alginic acid or a salt thereof such as sodium alginate.

In addition, enteric coating can be useful if it is desirable to prevent exposure of the compounds of the invention to the gastric environment.

Pharmaceutical compositions which can be used orally include push-fit capsules made of gelatin as well as soft, sealed capsules made of gelatin and a plasticizer, such as glycerol or sorbitol. The push-fit capsules may contain the active ingredients in admixture with filler such as lactose, binders such as starches, lubricants such as talc or magnesium stearate and, optionally, stabilizers.

In soft capsules, the active compounds may be dissolved or suspended in suitable liquids, such as fatty oils, liquid paraffin, or liquid polyethylene glycols. In addition, stabilizers may be added.

The compounds of general Formulae (I), (Ia), (Ib), (Ic), (Id), and (IIa), particularly of structural formulae 1, 2, 3, 4, 5, 6, 7, 8, 9, 10 and 11, more particularly the specific compounds of Formulae 1, 2, 3, 10 and 11, and the pharmaceutically acceptable salts thereof, may be formulated as nanoparticles. The nanoparticles may be prepared in well-known polymers, e.g. polylactic-co-glycolic acid. Generally, the compounds may be co-dissolved with the polymer in a suitable organic solvent, and the organic phase may be then dispersed in an aqueous phase comprising stabilizers and/or surface-active agents. The stabilizer may be, e.g., polyvinyl alcohol. Upon evaporation of the organic solvent from the aqueous phase, the nanoparticles may be purified, e.g. by centrifugation and washing.

According to some embodiments, the pharmaceutical composition comprises a VDAC1-based peptide according to the present invention and a shielding particle. In certain embodiments the shielding particle comprises polyethyleneglycol (PEG) and/or lipids.

According to some embodiments, the VDAC1-silencing oligonucleotide molecule is encapsulated within Polyethylenimine (PEI)-Poly(D,L-lactide-co-glycolide) (PLGA) nanoparticle.

The composition can be formulated as a suppository, with traditional binders and carriers such as triglycerides, microcrystalline cellulose, gum tragacanth or gelatin.

Pharmaceutical compositions of the present invention may be manufactured by processes well known in the art, e.g., by means of conventional mixing, dissolving, granulating, grinding, pulverizing, dragee-making, levigating, emulsifying, encapsulating, entrapping or lyophilizing processes according to the general guidance provided in the art, e.g. by Remington, The Science and Practice of Pharmacy (formerly known as Remington's Pharmaceutical Sciences), ISBN 978-0-85711-062-6.

The dosage of a composition to be administered will depend on many factors including the subject being treated, the stage of the IBD disease, the route of administration, and the judgment of the prescribing physician.

The pharmaceutical compositions of the invention can further comprise one or more active agents known to treat an IBD disease, or one or more symptoms associated therewith.

Therapeutic Use

The present invention provides methods for slowing the progression of or treating a NETosis-related disease or one or more symptoms associated therewith comprising administering to a subject in need of such treatment a VDAC1 inhibiting compound or a pharmaceutical composition comprising same, thereby slowing the progression of or treating the NETosis-related disease or one or more symptoms associated therewith.

In some embodiments, the method of the invention further comprises a step of selecting a subject suitable for treatment of a disease as disclosed herein, using a VDAC1 inhibiting compound. In some embodiments, a suitable subject has increased levels of: NET (i.e., NETosis), cytosolic mtDNA, or any combination thereof, compared to control.

Methods for determining the levels of NETosis, and cytosolic mtDNA would be apparent to one of ordinary skill in the art.

Non-limiting example for a protocol of quantification and visualization of NETs is as follows: NETs are induced in, for example normal-density granulocytes by incubating the cells with calcium ionophore A23187 (25 µM) in RPMI 1640 medium for 2 h, and NETs are then quantified using SYTOX fluorescent dye at 485/520 nm to quantify extracellular DNA. The fluorescence, of PicoGreen for example, at t=0 min is measured at 485/520 nm (emission/extinction) to quantify the total DNA. Another non-limiting example for NETs quantification includes fluorescence microscopy. Briefly, the cells are attached to coverslip chambers, stimulated for 90 min at 37° C. with calcium ionophore, fixed with 4% paraformaldehyde overnight at 4° C., and permeabilized with 0.2% Triton X-100 for 10 min, followed by 0.5% gelatin for 20 min. The cells are than stained with antibodies against human neutrophil elastase for 2 h at room temperature, washed in PBS, and stained with Hoechst 33342 and Alexa Fluor 488 secondary antibody for 2 h at room temperature. After mounting, the cells are visualized by confocal microscopy.

Without wishing to be bound by any theory or mechanism of action, the ability of the compounds of general Formulae (I), (Ia), (Ib), (Ic), (Id), and (IIa), particularly the compound having Formula 1 (VBIT-4), to inhibit VDAC oligomerization, mtDNA release, and neutrophil extracellular traps (NETs), contributes to their therapeutic effect in treating IBD, e.g. Chron's disease and UC.

As used herein, the term "mtDNA" encompasses intact mtDNA, fragments thereof, or a combination thereof.

In some embodiments, the method is directed to reducing or inhibiting mtDNA or its fragments leakage from the mitochondria. In some embodiments, the method is directed to reducing the amount or level of circulating mtDNA. In some embodiments, the method is directed to inhibiting or reducing the amounts or levels of mtDNA/fragments in the matrix or intra-cristae space of the mitochondria, the peripheral space of the mitochondria, or both, the cytoplasm, the extracellular environment, the circulation (e.g., blood, serum), or any combination thereof. In some embodiments, IBD or disorder comprises mtDNA/fragments leakage.

As used herein, the term "intra-cristae space" refers to the space formed within the cristae of the mitochondrial inner membrane. As used herein, the term "peripheral space" refers to the space formed between the mitochondrial inner membrane and outer membrane.

Methods for determining the amount or level of mtDNA leakage or circulating mtDNA are common and would be apparent to one of ordinary skill in the art. A non-limiting example for a method of determining the amount of circulating mtDNA/fragments leakage, is exemplified hereinbelow, and includes but is not limited to real-time quantitative PCR and specific primers use.

In some embodiments, there is provided a composition for use in reducing the amount or level of circulating mtDNA/fragments, wherein circulating is in the cytoplasm, the extracellular environment, the circulation (e.g., blood, serum), or any combination thereof.

In some embodiments, the method is directed to treating IBD by administering a therapeutically effective amount of VDAC inhibitor or a composition comprising thereof to a subject having increased circulating mtDNA/fragments amount or levels.

The term "VDAC" as used herein, unless the context explicitly dictates otherwise, refers to Voltage-Dependent Anion Channel proteins of a highly conserved family of mitochondrial porins. The term refers to all VDAC isoforms, e.g. to isoform VDAC1, to isoform VDAC2, or to isoform VDAC3.

In some embodiments, the present invention provides methods for slowing the progression of or treating IBD or one or more symptoms associated therewith comprising administering to a subject in need of such treatment a VDAC inhibiting compound or a pharmaceutical composition comprising same, thereby slowing the progression of or treating IBD or one or more symptoms associated therewith.

The symptoms and degree of severity can vary, and include one or more of: disorders that usually parallel IBD flare-ups, disorders that are clearly associated with IBD but appear independently of IBD activity, and disorders that are consequences of disrupted bowel physiology.

Non-limiting examples for disorders that usually parallel IBD flare-ups symptoms include, but are not limited to: peripheral arthritis, episcleritis, aphthous stomatitis, and erythema nodosum. Arthritis tends to involve large joints and be migratory and transient. One or more of these parallel disorders develops in more than one third of patients hospitalized with IBD.

Non-limiting examples for disorders that are clearly associated with IBD but appear independently of IBD activity include, but are not limited to: ankylosing spondyliitis, sacroiliitis, uveitis, pyoderma gangrenosum, primary sclerosing cholangitis, Hashimoto-Thyreoiditis, rheumatoide arthritis, psoriasis, Morbus Crohn, sarkoidose (lung), and granulomat thyreoiditis de Quervain. Ankylosing spondyliitis occurs more commonly in IBD patients with the HLA-B27 antigen. Most patients with spinal or sacroiliac involvement have evidence of uveitis and vice versa. Primary sclerosing cholangitis, which is a risk factor for cancer of the biliary tract, is strongly associated with UC or Crohn colitis. Cholangitis may appear before or concurrently with the bowel disease or even 20 year after colectomy. Liver disease (e.g., fatty liver, autoimmune hepatitis, pericholangitis, cirrhosis) occurs in 3 to 5% of patients, although minor abnormalities in liver function tests are more common. Some of these conditions (e.g., primary sclerosing cholangitis) may precede IBD by many years and, when diagnosed, should prompt an evaluation for IBD.

Non-limiting examples for disorders that are consequences of disrupted bowel physiology occur mainly in severe Crohn disease of the small bowel and include, but are not limited to malabsorption which may result from extensive ileal resection and cause deficiencies of fat-soluble vitamins, vitamin B12, or minerals, resulting in anemia, hypocalcemia, hypomagnesemia, clotting disorders, and bone demineralization. In children, malabsorption retards growth and development. Other disorders include kidney stones from excessive dietary oxalate absorption, hydroureter and hydronephrosis from ureteral compression by the intestinal inflammatory process, gallstones from impaired ileal reabsorption of bile salts, and amyloidosis secondary to long-standing inflammatory and suppurative disease.

Thromboembolic disease may occur as a result of multiple factors in all 3 categories (i.e., disorders that usually parallel IBD flare-ups, disorders that are clearly associated with IBD but appear independently of IBD activity, and disorders that are consequences of disrupted bowel physiology).

According to one embodiment of the present invention, the IBD is Chron's disease. According to another embodiment, the IBD is ulcerative colitis (UC). According to some embodiments, the IBD is a NETosis-dependent disease. According to some embodiments, the IBD is a NETosis-dependent inflammatory disease.

The term "NETosis-related disease" as used herein refers to any inflammatory disease or disorder comprising the release of neutrophil extracellular traps upon neutrophil cell death.

The subject to be treated by the methods of the present invention is a human subject selected from the group consisting of a patient afflicted with the disease, a patient afflicted with the disease wherein the patient is in remission, a patient afflicted with the disease having manifested symptoms associated with the disease, and any combination thereof.

In some embodiments, the method of the invention further comprises a step of selecting a subject suitable for treatment using the VDAC inhibiting compound of the invention, wherein selecting comprises determining the subject has increased VDAC1 expression levels compared to healthy control.

In some embodiments, the method of the invention further comprises a step for monitoring the effectiveness or progression of treatment in the subject, wherein monitoring comprises determining the treated subject has reduced VDAC1 expression levels compared to a non-treated control. As used herein, non-treated control comprises an afflicted subject as disclosed hereinabove which was not administered with the VDAC inhibiting compound of the invention or an afflicted subject prior to treatment with the VDAC inhibiting compound of the invention.

In some embodiments, the method of the invention further comprises a step of selecting a subject suitable for treatment using the VDAC inhibiting compound of the invention, wherein selecting comprises determining the subject has increased NETosis compared to healthy control.

In some embodiments, the method of the invention further comprises a step for monitoring the effectiveness or progression of treatment in the subject, wherein monitoring comprises determining the treated subject has reduced NETosis compared to a non-treated control. As used herein, non-treated control comprises an afflicted subject as disclosed hereinabove which was not administered with the VDAC inhibiting compound of the invention or an afflicted subject prior to treatment with the VDAC inhibiting compound of the invention.

It will be appreciated by skilled artisan that the above-listed IBD are associated with severe symptoms, the amelioration of which provides significant therapeutic benefit even in instances where the underlying disease may not be ameliorated. The methods of the present invention find use in the treatment and/or prevention of myriad adverse symptoms associated with the above-listed IBD.

The term "therapeutically effective amount" as used herein with regard to a compound of the invention is an amount of a compound that, when administered to a subject will have the intended therapeutic effect, e.g. improving symptom(s) associated with IBD. The full therapeutic effect does not necessarily occur by administering one dose, and may occur only after administering a series of doses. Thus, a therapeutically effective amount may be administered in one or more doses. The precise effective amount needed for a subject will depend upon, for example, the subject's weight, health and age, the nature of the IBD, the extent and severity of the symptoms of the specific IBD, the mode of administration of the pharmaceutical composition of the invention, and optionally, the combination of the pharmaceutical composition of the invention with additional active agent(s).

The term "treating" as used herein refers to inhibiting the disease state, i.e., arresting the development of the disease state or its clinical symptoms, or relieving the disease state, i.e., causing temporary or permanent regression of the disease state or its clinical symptoms. The term is interchangeable with any one or more of the following: abrogating, ameliorating, inhibiting, attenuating, blocking, suppressing, reducing, halting, alleviating or preventing the disease or any symptoms associated with the disease.

The term "preventing" as used herein means causing the clinical symptoms of the disease state not to develop in a subject that may be exposed to or predisposed to the disease state, but has not yet experienced or displayed symptoms of the disease state.

Animal models may serve as a resource for evaluating treatments for IBD.

The dose of the VDAC inhibiting compound required to achieve treatment of a disease usually depends on the pharmacokinetic and pharmacodynamic properties of the compound, which is to be administered, the patient, the nature of the disease, and the route of administration. Suitable dosage ranges for such compounds may be from 1.0 to 100 mg/kg body weight.

According to some embodiments, the methods of the present invention involve contacting a neutrophil with one or more compounds of the present invention, or a pharmaceutical composition comprising same in an amount effective to reduce mitochondrial DNA release and/or NETs formation by at least 10%, 20%, 30%, 40%, 50%, 60%, 70% or more, as compared to pretreatment levels.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

EXAMPLES

Materials and Methods
Reagents and Preparations

Dextran Sulfate Sodium, MP Biomedicals, MW:36-50 kDa, Catalog No. #0216011010 was prepared once by appropriate dilution with drinking water (2.5 grams per 100 ml) to reach a concentration of 2.5% (w/v), and in sufficient amount required for proper filling of water bottles for the designated test groups, specified herein: VBIT-4VBIT-12 were synthesized by ChemPartner (>95% purity). Rabbit monoclonal anti-VDAC1 (Abcam ab154856, 1:500), Rabbit monoclonal anti-Ki67 (RM-9106-s1, 1:100), caspase −3 (Cell Signaling Technology, 1:300). Horseradish peroxidase (HRP)-conjugated anti-mouse, anti-rabbit and anti-goat antibodies were from KPL (Gaithersburg, MD). 3,3-diaminobenzidine (DAB) was obtained from (ImmPact-DAB, Burlingame, CA). Tissue array slides were purchased from Biomax (Derwood, US Biomax).

Experimental Animals

Healthy female, specific pathogen free (SPF) C57BL/6 (H-2b), 6-7 weeks old mice were obtained from Invigo, Israel. Animal housing and care conditions was maintained according to the experimental protocols approved by the Institutional Animal Care and Use Committee. Mice were weighed and examined for health.

Animals were provided ad libitum a commercial rodent diet, and free access to either regular or DSS-containing drinking water for the respective designated test groups, supplied to each cage via polyethylene bottles with stainless steel sipper tubes.

IBD Mouse Model—Study Program

Dextran sodium sulfate (DSS)-induced colitis was used. These mice have increased proliferation of enterocytes, suggesting that increased intestinal ATP levels (which were due to mtDNA polymorphisms) causes a surge in the turnover rate of the intestinal epithelium—a process that is central to the renewal of the epithelium after exposure to harsh conditions and noxious provocations, such as DSS.

Colitis Induction

All animals were subjected to experimental Colitis induction by providing DSS in the drinking water, continuously supplied ad libitum for 6 days, followed subsequently by 8 days of regular drinking water until study termination on day 14 (FIG. 1A).

Examinations and Observations
Body Weight

Determination of individual body weights of mice was performed before disease induction and thereafter once daily, starting from study day 0 until the time of scheduled euthanasia of survivors on Day 14.

Clinical Signs, Morbidity and Mortality Check

Animals were observed, and clinical signs recorded once daily starting from study day 1 and onwards until the time of scheduled euthanasia. Evaluation of clinical signs was scored according to the grading system listed below.

TABLE 1

Score points

| Score points | Stool consistency and rectal bleeding |
|---|---|
| 0 | Normal |
| 1 | Slight traces of blood or excrements (diarrhea) |
| 2 | Large stains of bloody diarrhea |
| 3 | Massive diarrhea with blood or w/o blood and piloerection |
| 4 | Gross bleeding with diarrhea or tremor |
| 5 | Death |

Study Termination
Euthanasia—
At the end of the study, survived animals were euthanized by $CO_2$ asphyxiation.
Colon Length and Weight Measurement—
Immediately after euthanasia, the entire large intestine from the ileo-caecal junction to the anus were removed, weighed and the length of the colon was measured using a ruler.
Calculation of Mean Maximal Score (MMS)
The Maximal Scores of all mice in each group was be summed, and the MMS calculation was as follows:

$$\text{Mean Maximal Score} = \frac{\sum \text{Maximal score of each mice}}{\text{No. of mice in the group}}$$

Calculation of Group Mean Score (GMS)
The maximal scores of all rats in each group were summed, and the mean maximal score and the % activity of the group was calculated as follows:

$$\text{Mean score} = \frac{\sum \textit{IMS} \text{ of each rat}}{\text{No. of rats in the group}}$$

Calculation of the Colon Length
The mean colon length of each group was calculated, and the percentage of shortening of the colon was calculated as follows:

$$\text{Mean Colon Length } (MCL) = \frac{\sum \text{colon length of each rat}}{\text{No. of rats in the group}}$$

$$\% \textit{ ColonShortening} = \frac{MCL \text{ of treated group}}{MCL \text{ of control group}} \times 100$$

Calculation of the Caecum Length
The mean caecum length of each group was calculated, and the percentage of shortening of caecum was calculated as follows:

$$\text{Mean Caecum Length } (MCcL) = \frac{\sum \text{caecum length of each rat}}{\text{No. of rats in the group}}$$

$$\% \textit{ CaecumShortening} = \frac{MCcL \text{ of treated group}}{MCcL \text{ of control group}} \times 100$$

Tissue Culture
Murine colorectal carcinoma cell line from a BALB/c mouse (CT26) and mouse embryonic fibroblast (MEF) cell lines were grown at 37° C. under an atmosphere of 95% air and 5% $CO_2$ in DMEM supplemented with 10% FBS, 2 mM L-glutamine, 1,000 U/ml penicillin and 1 mg/ml streptomycin.
mtDNA Release from Cells as Induced by $H_2O_2$
Cells were seeded (150,000 cells/well) in 6-well culture dishes to 40-60% confluence. After 24 h cells were incubated for 20 h with 100 or 200 µM of $H_2O_2$ in the absence or the presence of VBIT-4 and VBIT-12. Cells washed and subjected to mtDNA release as described below. For VDAC1 silencing, CT-26 cells were seeded (150,000 cells/well) in 6-well culture dishes to 40-60% confluence. After 24 h cells were transfected with 75 nM of non-targeting siRNA (si-NT) or siRNA targeting VDAC1 recognizing both human and mouse VDAC1 (si-m/hVDAC1) using the JetPRIME transfection reagent, according to the manufacturers' instructions. Forty-eight (48) h post-transfection with either si-NT or si-m/hVDAC1, cells were incubated for 20 h with 100 µM of $H_2O_2$. Cells washed and subject to mtDNA release as described below.
Quantification of mtDNA Release
Cells (e.g., CT-26, MFFs) were re-suspended in 170 µl digitonin buffer containing 150 mM NaCl, 50 mM HEPES pH 7.4, and 25 µg/ml digitonin (EMD Millipore Corp). The homogenates are incubated on a rotator for 10 min at room temperature, followed by centrifugation at 16,000 g for 25 min at 4° C. A 1:20 dilution of the supernatant (cmtDNA) is used for real-time RT-PCR. The pellet is resuspended in 340 µl lysis buffer containing 5 mM EDTA and proteinase K (Qiagen) and incubated at 55° C. overnight. The digested pellet is diluted with water (1:20 to 1:100) and heated at 95° C. for 20 min to inactivate proteinase K, and the sample is used for real-time PCR. The primers used are as follow (5'-3'): D-loop3 forward (SEQ ID NO:34) and reverse (SEQ ID NO:35). The cmtDNA in the supernatant is normalized to the total Cox-II encoded by mitochondrial DNA.
For the quantification of mtDNA in the serum obtained from the mice, DNA was extracted from serum obtained from control mice, 2% DSS-treated mice with and without treatment with VBIT-12 (20 mg/kg) started at day 2 (VBIT-12-2) or 5 VBIT-12-5) following the start of DSS treatment or treated with dexamethasone (DEXA, 0.5 mg/kg) using the DNeasy Tissue and Blood kit (QIAGEN, cat No 51104) according to the manufacturer's instructions. Five ng of total DNA was used for detection of mtDNA by qPCR and mtDNA specific primers for the D-loop region: forward primer (SEQ ID NO:34) and reverse primer (SEQ ID NO:35). The results were normalized for cytochrome c oxidase subunit 2, (Cox-II) and presented as fold of change relative to the level of mtDNA in the control mice plasma.
Immunohistochemistry (IHC)
Immunohistochemical staining of VDAC1 was performed on tissue microarray slides obtained from Biomax US (CO245 D5, https://www.biomax.us/CO245 D5) The array contains colon sections from: healthy (4 samples), Chronic esocolitis, also represents inflammation (4 samples), Chronic ulcerative colitis also represents inflammation (4 samples), Crohn's disease of ileocecal junction, also represents inflammation (4), and adenocarcinoma, representing malignancy (4). Human Autoimmune Tissue microarray was from Provitro, (Provitro GmbH, Cat.-No.: 401 3301). The array contains Hashimoto-Thyreoiditis (6 samples, Thyroid), Rheumatoide Arthritis (2 samples, Synovial), Psoriasis (2 samples, Synovial), Morbus Crohn (2 samples, Sigma), sarkoidose (2 samples lung), Granulomat Thyreoiditis de Quervain (2 samples, Thyroid), and healthy tissues.

Representative sections of tissues were incubated overnight at 4° C. with anti-VDAC1 antibodies diluted in 1% BSA in PBS and then with secondary antibodies diluted in 1% BSA in PBS. The slides were subsequently treated with 3'3-diaminobenzidine tetra-hydrochloride (DAB) and counter-stained with hematoxylin. Negative controls were incubated without primary antibody. Sections of tissue were observed under an Olympus microscope and images were taken at 200× magnification with the same light intensity and exposure time. Quantitation of VDAC1 expression levels in the whole area of the provided sections, as reflected in the staining intensity was performed using a panoramic microscope and HistoQuant software (Quant Center 2.0 software, 3DHISTECH Ltd).

TUNEL Assay

Fixed colon sections in paraffin were processed for a TUNEL assay using the DeadEnd Fluorometric TUNEL system (Promega, Madison, WI) according to the manufacturer's instructions. Sections were deparaffinized, equilibrated in PBS, permeabilized with proteinase K (20 µg/ml in PBS), post-fixed in 4% paraformaldehyde, and incubated in TdT reaction mix for 1 h at 37° C. in the dark. The slides were then washed in saline-sodium citrate (SSC) buffer and counter-stained with PI (1 µg/ml). After mounting with Vectashield mounting medium (Vector Laboratories, Burigame, CA), images were collected using a confocal microscope (Olympus IX81).

Example 1

The Effects of VDAC Inhibitors on DSS-Induced IBD Mice

Figure 2:
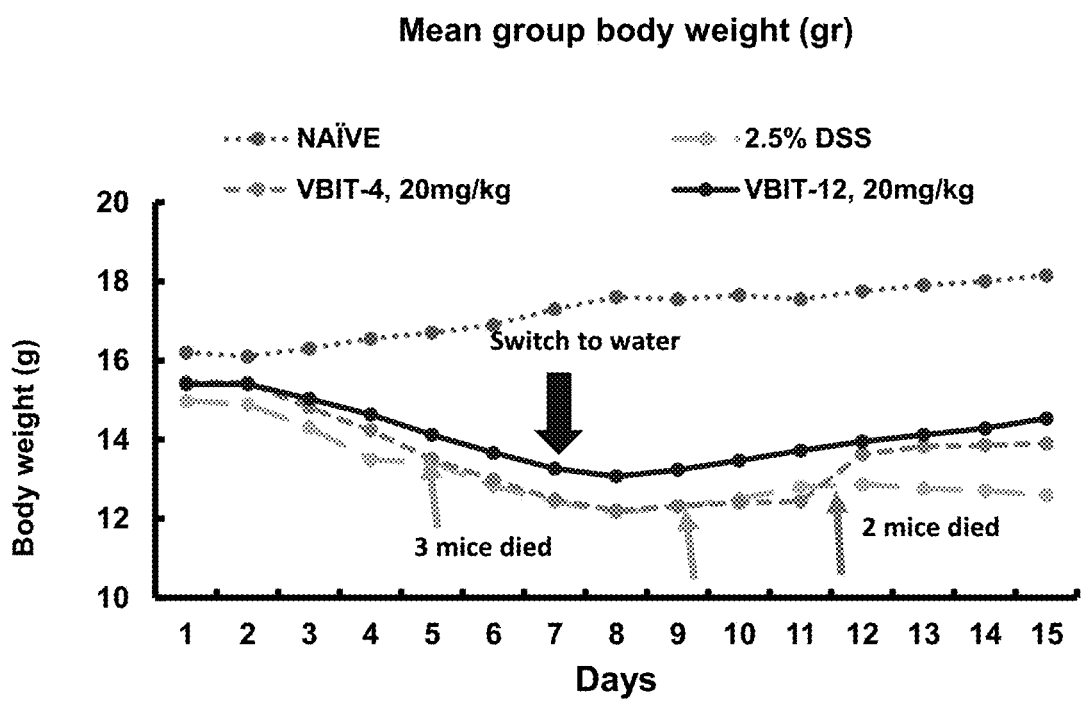
FIG. 2 is a graph showing the effects of VBIT-4 and VBIT-12 on weights in DSS-induced inflammatory bowel disease (IBD) mice.
Figure 3:
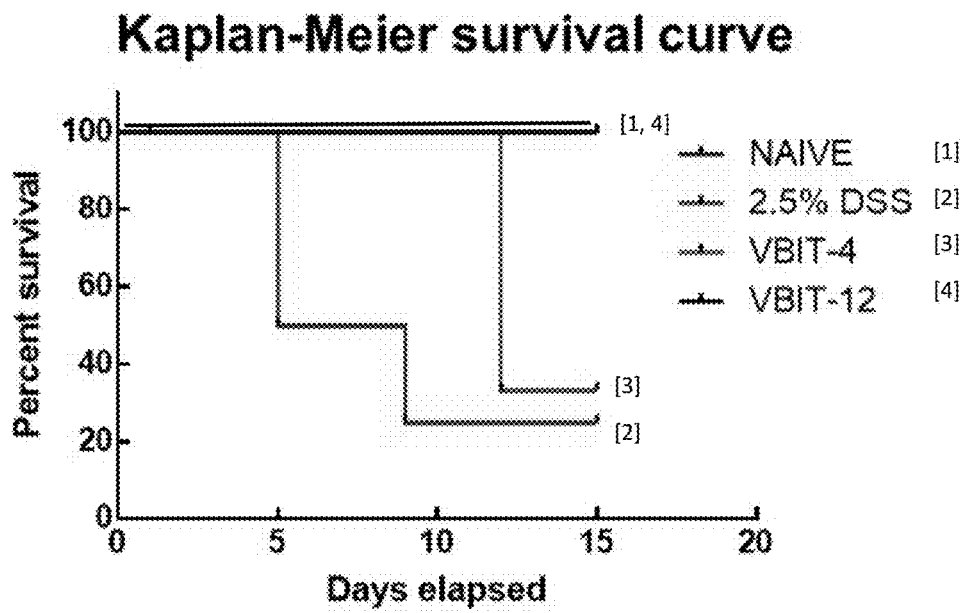
FIG. 3 is a graph showing the effects of VBIT-4 and VBIT-12 on survival in DSS-induced IBD mice.

VDAC-1 specific inhibitors were found to ameliorate some of the severer clinical manifestations of IBD in a mice model. DSS-induced IBD mice were found to have reduced body weights (FIG. 2; Table 2) and poor survival (FIG. 3; Table 3). DSS-induced IBD mice administered with VDAC-1 inhibitors, e.g., VBIT-4 and specifically, VBIT-12, were shown to have both higher weights (FIG. 2; Table 2) and increased survival rates (FIG. 3; Table 3), at experiment termination, resembling non-IBD control.

TABLE 2

The effect of VDAC inhibitors on weight of DSS-induced IBD mice

| Group | Weight (gr) day 1 | Weight (gr) day 8 | Change (%) | Weight (gr) day 15 | Change (%) |
|---|---|---|---|---|---|
| Control | 16.2 | 17.6 | +1.4 (+8.6) | 18.15 | 0.55 (3.1) |
| DSS | 14.98* | 12.2 | −2.78 (−18.6) | 12.6 | 0.40 (3.3) |
| DSS + VBIT-4 | 15.4 | 12.2 | −3.2 (−20.8) | 13.9 | 1.7 (13.9) |
| DSS + VBIT-12 | 15.4 | 13.1 | −2.3 (−14.9) | 14.53 | 1.43 (10.92) |

*3 mice died

TABLE 3

The effect of VDAC inhibitors on the survival of DSS-induced IBD mice.

| Group | Dose (mg/kg) | n | died | % Mortality |
|---|---|---|---|---|
| Naïve | | 2 | 0 | 0 |
| 2.5% DSS | | 6 | 3 | 50 |
| 2.5% DSS + VBIT-4 | 20 mg/kg | 6 | 2 | 33.3 |
| 2.5% DSS + VBIT-12 | 20 mg/kg | 6 | 0 | 0 |

Figure 4A:
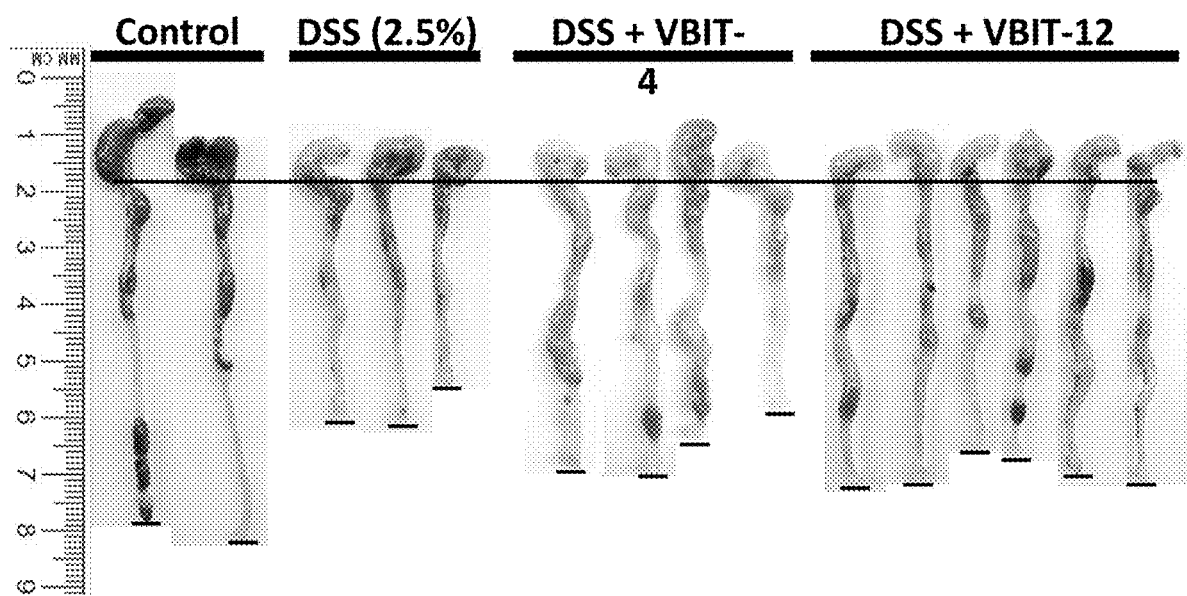
FIGS. 4A-4B are images and a graph showing the effects of VBIT-4 and VBIT-12 on colon length of DSS-induced IBD mice. (3A) is images of colons dissected from control mice, DSS-induced control (DSS 2.5%), DSS+VBIT-4, and DSS+VBIT-12. (3B) is a vertical bar graph showing the % of colon shortening in the VBIT-4 and -12 treated mice, relative to the DSS-induced control.
Figure 4B:
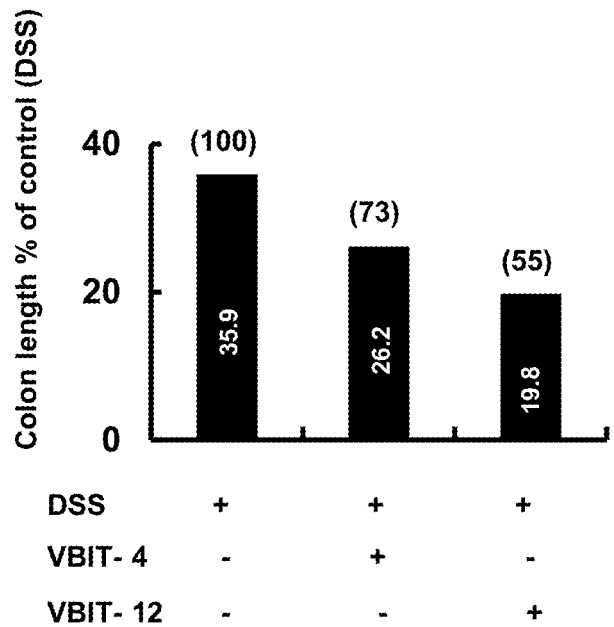

In addition, it was shown that VDAC inhibitors reduced the % of colon shortening, a hallmark of IBD. Treated animals were found to have substantially longer colons, relatively to colons dissected from DSS-induced IBD mice (FIGS. 4A-4B; Table 4).

TABLE 4

The effect of VDAC inhibitors on colon length of DSS-induced IBD mice.

| Group | Dose (mg/kg) | n | Colon length, mm | Colon, % Shortening | Cecum length, mm | Cecum, % Shortening |
|---|---|---|---|---|---|---|
| Naïve | | 2 | 65.20 ± 2.82 | | 13.0 ± 4.2 | |
| 2.5% DSS | | 6 | 41.66 ± 4.93 | 35.9 (100) | 8.8 ± 1.0 | 38.5 |
| DSS + VBIT-4 | 20 | 6 | 48.00 ± 4.84 | 26.2 (73) | 8.7 ± 2.4 | 33.1 |
| DSS + VBIT-12 | 20 | 6 | 52.16 ± 2.92 | 19.8 (55.1) | 8.0 ± 1.1 | 38.5 |

Figure 5:
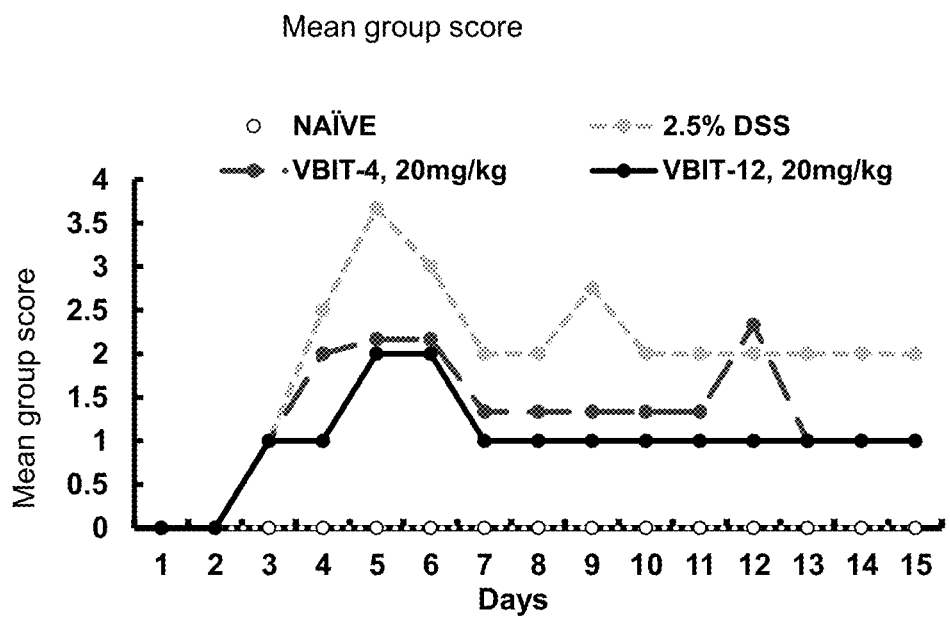
FIG. 5 is a graph showing the effect of VBIT-4 and VBIT-12 on the group mean score (GMS) of DSS-induced IBD mice. GMS was calculated based on criteria disclosed in Table 2.

Examination of stool consistency and rectal bleeding in IBD mice, showed the latter were afflicted by severer bloody diarrhea and the like, as reflected by an MMS value of over 3 (Table 5). Furthermore, both treated groups had lower GMS compared to IBD mice throughout most of the experiment (FIG. 5).

TABLE 5

The effect of VDAC inhibitors on MMS of DSS-induced IBD mice.

| Group | Dose (mg/kg) | n | MMS |
|---|---|---|---|
| Naïve | | 2 | 0 |
| 2.5% DSS | | 6 | 3.27 ± 2.3 |

TABLE 5-continued

The effect of VDAC inhibitors
on MMS of DSS-induced IBD mice.

| Group | Dose (mg/kg) | n | MMS |
|---|---|---|---|
| DSS + VBIT-4 | 20 | 6 | 3.05 ± 0.55 |
| DSS + VBIT-12 | 20 | 6 | 2.33 ± 0.1 |

Tissue in depth observation, using both standard histological staining (FIGS. 6 and 7) and immunostaining (FIG. 8), showed that the colon wall of IBD mice was significantly thicker, with larger villi than that of a non-IBD control. IBD colons were also found to contain large lymphatic sacks and also experienced high infiltration of inflammatory cells towards the colonic lumen. On the contrary, VBIT-4 treated mice were found to have thinner colon walls, i.e., smaller villi, compared to the IBD mice (comparable to those of non-IBD mice) and also seemed to accommodate fewer inflammatory cells with reduced/no infiltration activity (FIGS. 6-8). Mice treated with VBIT-12 were indistinguishable from non-IBD control in all of the performed histological examinations (FIGS. 6-8).

The effects of VBIT-12 administered by gavage once or twice a day to DSS-mice showed that administrating twice resulted in better effect on the colon length a well as on the spleen (FIG. 9). The spleen weight was analyzed for the various groups showing increased weight of in the DSS-treated group, that was decreased by VBIT-12 to close to the weight in the control DSS-untreated control group (FIG. 9). Increased spleen weights generally correlate with the extent of inflammation and anemia.

The expression of the cell proliferation marker Ki-67, as shown by IHC staining was highly increased in the DSS-treated mice and was decreased by VBIT-12 treatment to the level of control mice (FIG. 10).

IHC staining for caspase-3 in colon sections from DSS-treated mice showed increased caspase 3 levels (FIG. 11A-11F), reflecting increased apoptosis, as was further demonstrated by TUNEL staining (FIG. 11G-11L). Both caspase-3 levels and TUNEL staining were highly reduced in the DSS-mice treated with VBIT-12.

Example 2

VDAC1 is Overexpressed in Colon Pathological Conditions

Figure 12Q:
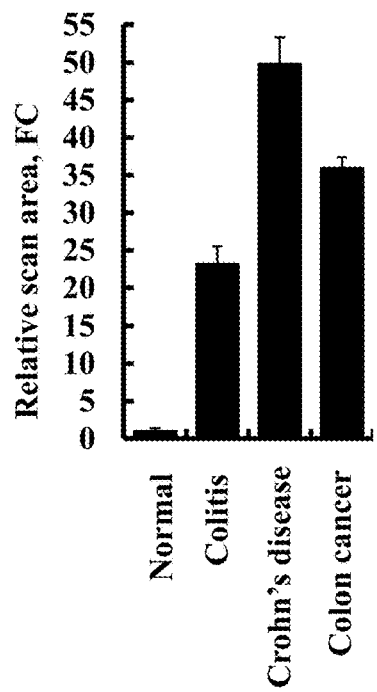
Figure 13A:
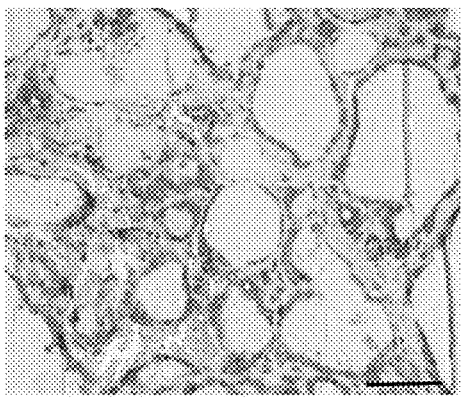
FIGS. 13A-13J are micrographs of several autoimmune diseases showing VDAC1 expression. (13A) Normal thyroid, (13B) Normal Synovial, (13C) Granulomat, (13D) Rheumatoide Arthritis (Synovial), (13E) Hashimoto-Thyreoiditis, (13F) Psoriasis, (13G) Normal lung, (13H) Normal colon, (13I) Sarkoidose (lung), and (13J) Morbus Crohn (Sigma). Representative images from normal (FIGS. 13A-13B, and 13G-13H), and disease (FIGS. 13C-13F, and 13I-13J) tissues, IHC stained for VDAC1 are shown.
Figure 13B:
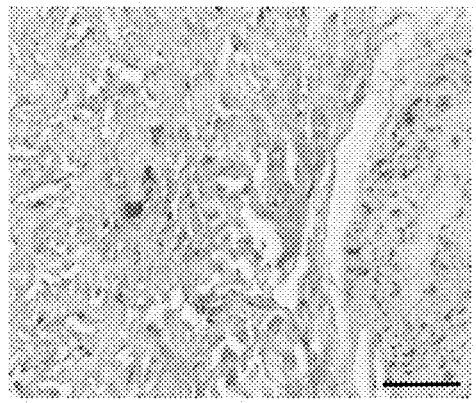
Figure 13C:
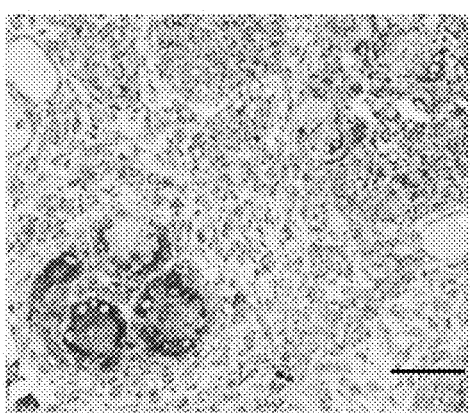
Figure 13D:
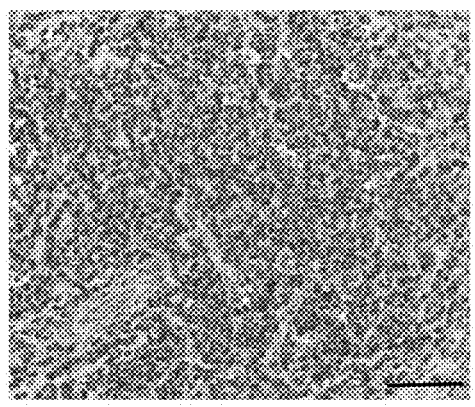
Figure 13E:
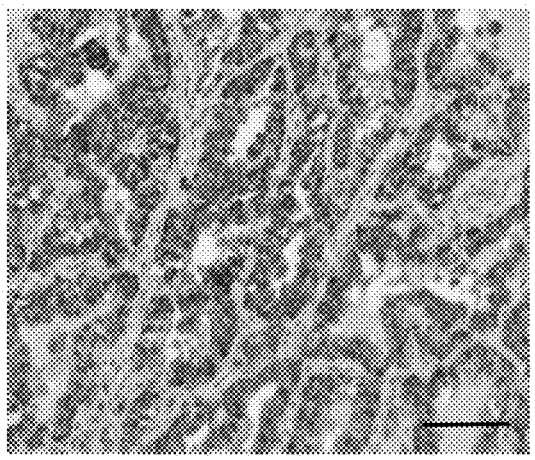
Figure 13F:
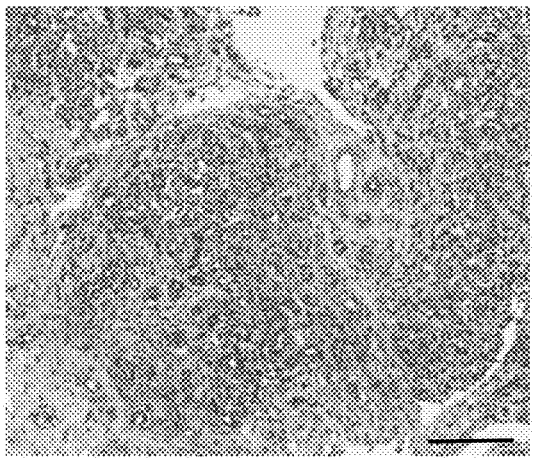
Figure 13G:
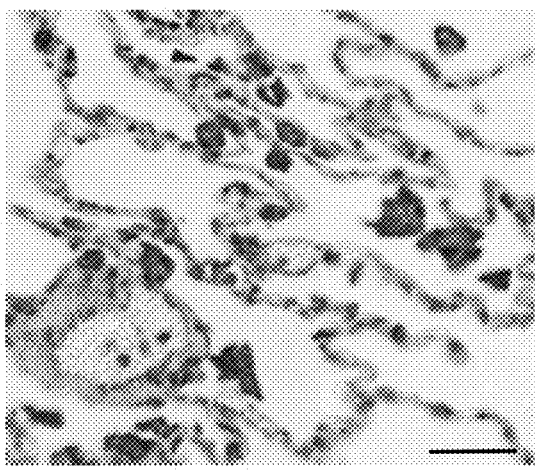
Figure 13H:
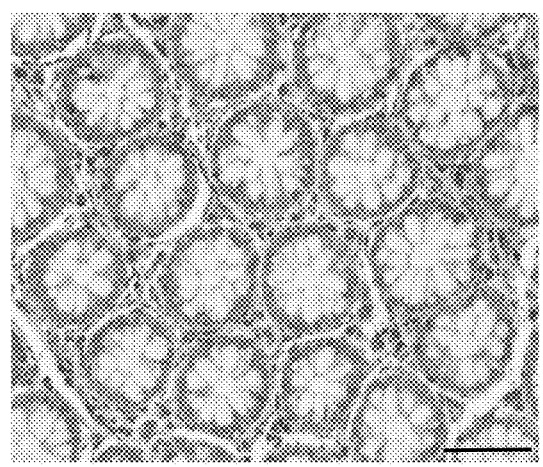
Figure 13I:
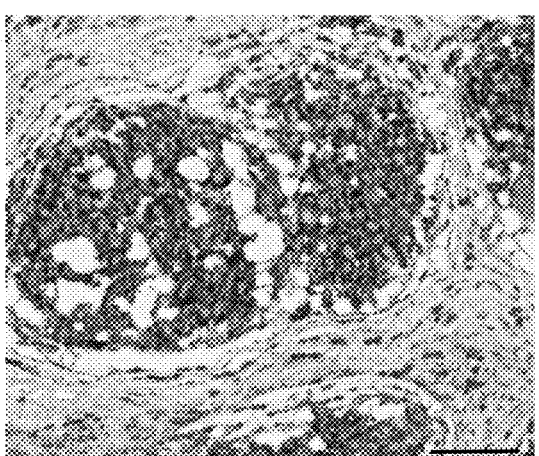
Figure 13J:
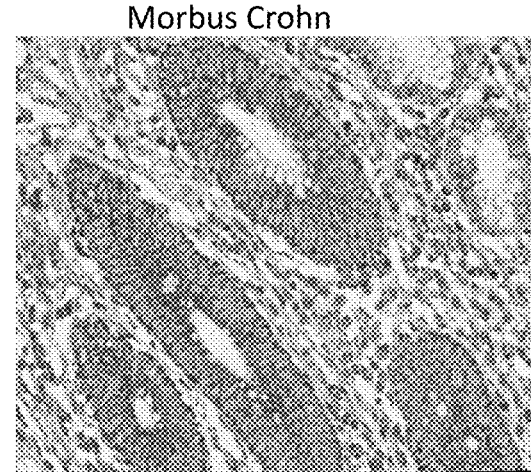

The inventors examined VDAC1 protein expression using immunohistochemistry (IHC). Briefly, IHC staining for VDAC1 of colon tissue sections obtained from healthy chronic esocolitis, chronic ulcerative colitis and Crohn's disease of ileocecal junctional also represents inflammation, also represents hyperplasia and colon cancer—adenocarcinoma were performed. IHC demonstrated high increase in VDAC1 expression levels (FIG. 12). Quantitative analysis showed that the levels of VDAC1 were increased by 30- to 55-fold in these pathological conditions (FIG. 12Q).

Other autoimmune diseases were also analyzed for VDAC1 expression using tissue microarray of human autoimmune diseases with the tissue presented in bracket. These include: Hashimoto-Thyreoiditis (Thyroid), Rheumatoide Arthritis (Synovial), Psoriasis (Synovial), Morbus Crohn (Sigma), sarkoidose (lung), and Granulomat. Representative images from healthy and disease tissues, IHC stained for VDAC1 using anti-VDAC1 antibodies. Quantitative analysis is also presented (FIG. 13).

Example 3

Figure 14:
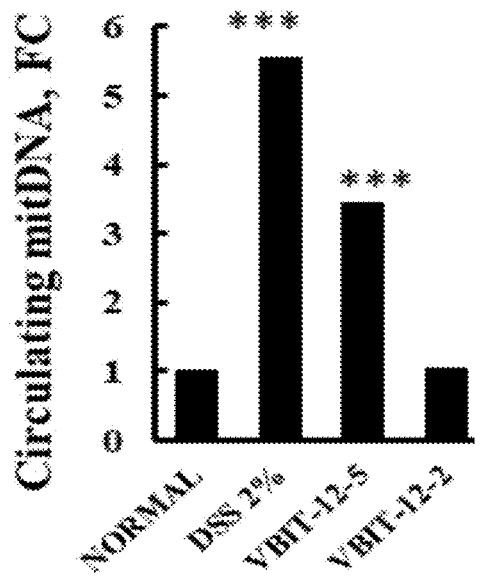
FIG. 14 is a vertical bar graph showing mitochondrial DNA (mtDNA) quantification in serum from DSS-induced UC mice. Five ng of total DNA was used for detection of mtDNA by qPCR and mtDNA specific primers for the D-loop region. The results were normalized for the mitochondria encoded gene cytochrome c oxidase subunit 2, (Cox-II) and presented as fold of change relative to the level of mtDNA in the control mice plasma. The differences were considered statistically significant with ***p<0.001.

Mitochondrial DNA Levels in Serum of DSS-Treated Mice with and without VBIT-12 Treatment The inventors examined whether there were increased levels of mtDNA in the circulation of a conventional IBD model organism. The results show that mice supplemented with DSS (e.g., induced IBD model) had increased mtDNA serum levels, with about 5.5-fold more compared to control. Further, the inventors showed that VBIT-12 administration had reduced the mtDNA serum level comparably to that of control DSS-untreated mice to the level of control DSS-untreated mice, when administered 2 days after the initial DSS supplementation (FIG. 14). Initiating VBIT-12 administration 5 days post-DSS treatment resulted in ~40% reduction of mtDNA serum levels.

Example 4

VDAC Inhibitors Reduce mtDNA Release from Different Cell Types

Figure 15:
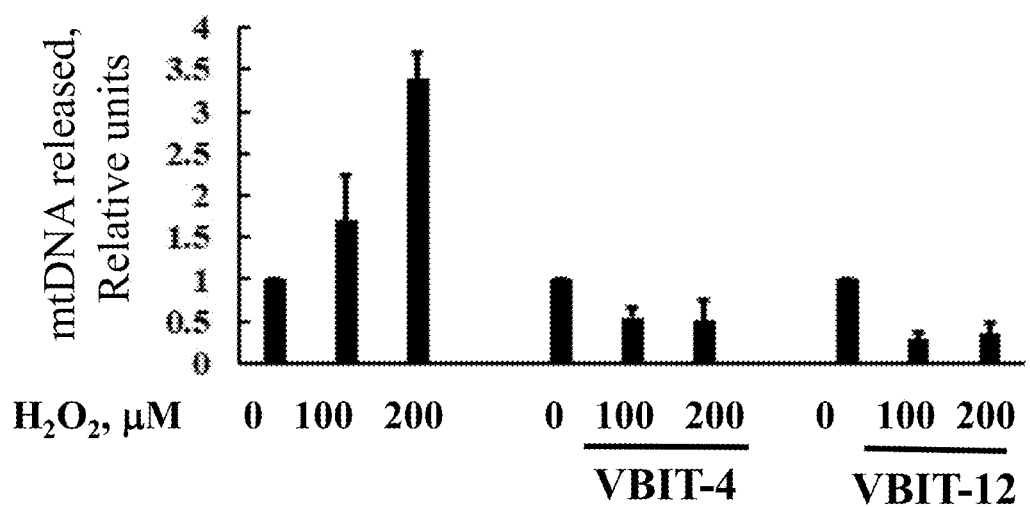
FIG. 15 is a vertical bar graph showing the release of mtDNA from cells induced by $H_2O_2$, and the effect of VBIT-4, or VBIT-12 (20 µM.)

The inventors further examined whether the release of mtDNA as induced by $H_2O_2$ in CT-26, a murine colorectal carcinoma cell line from a BALB/c mouse and MEFs (Murine Embryonic Fibroblasts) in cultures is inhibited by VBIT-12. Briefly, cells were seed (150,000 cells/well) in 6-well culture dishes to 40-60% confluence. After 24 h cells were incubated for 20 h with 100 or 200 μM of $H_2O_2$ in the absence or presence of VBIT-4, or VBIT-12 (20 μM). Cells washed and subjected to mtDNA release as described herein. The results show that VBIT-4 and VBIT-12 inhibited the release of mtDNA from cells in culture as induced by $H_2O_2$ (FIG. 15).

Figure 16:
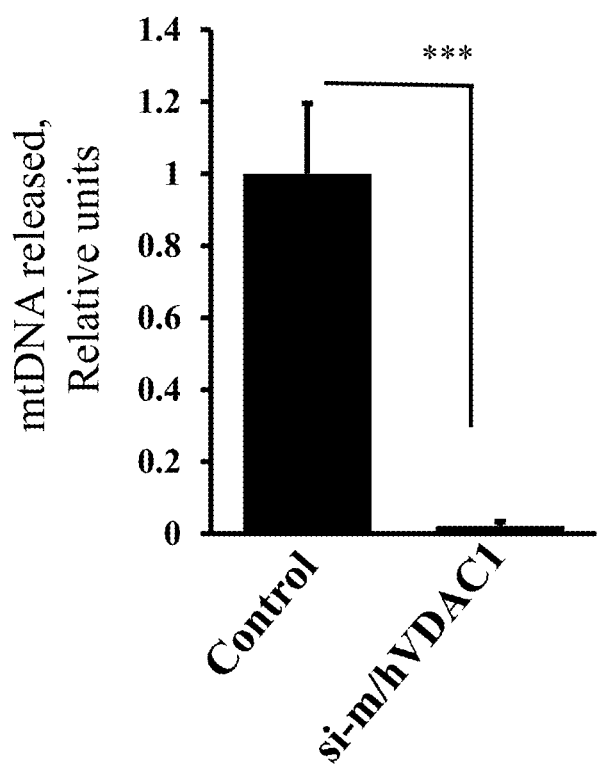
FIG. 16 is a vertical bar graph showing $H_2O_2$-induced mtDNA release from cells expressing VDAC1 but no from cells silenced for VDAC1 expression using specific siRNA (si-m/hVDAC1). The results are the mean±SEM, (n=3), ***p<0.001).

To test the requirement of VDAC1 for $H_2O_2$-induced mtDNA release, the release of mtDNA as induced by $H_2O_2$ from $C_{26}$ cells expressing VDAC1 and depleted of VDAC1 using VDAC1-specific siRNA, recognizing both human and murine VDAC1 (si-m/hVDAC1), was examined (FIG. 16). $H_2O_2$-induced release of mtDNA is obtained in cells expressing VDAC1, but not in cells depleted of VDAC1 (FIG. 16).

While certain features of the invention have been described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for slowing the progression of or treating inflammatory bowel disease (IBD) comprising administering to a subject in need of such treatment a pharmaceutical composition comprising a therapeutically effective amount of a VDAC inhibiting compound of the general Formula (Ic) including any enantiomer, diastereomer, salt, and mixture thereof:

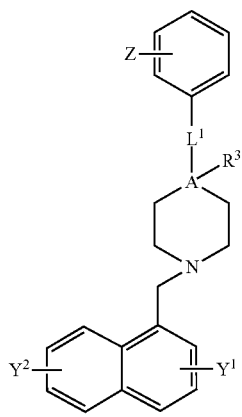

Formula (Ic)

wherein:
A is carbon (C);
R³ is a substituted amide;
Z is independently at each occurrence a functional group selected from the group consisting of, hydrogen, halo, haloalkyl, haloalkoxy, perhaloalkoxy, cyano, nitro, hydroxyl, alkyl, alkenyl, aryl, alkoxyl, aryloxyl, aralkoxyl, alkylcarbamido, arylcarbamido, amino, alkylamino, arylamino, dialkylamino, diarylamino, arylalkylamino, aminocarbonyl, alkylaminocarbonyl, arylaminocarbonyl, alkylcarbonyloxy, arylcarbonyloxy, carboxyl, alkoxycarbonyl, aryloxycarbonyl, sulfo, alkylsulfonylamido, alkylsulfonyl, arylsulfonyl, alkylsulfinyl, arylsulfinyl and heteroaryl;
L¹ is —NH—;
Y¹ and Y² are each independently absent or a halogen.

2. The method of claim 1, wherein R³ is —C(O)NHCH₂C(O)OH group.

3. The method of claim 1, wherein Z is $C_{1-2}$-alkoxy or $C_{1-2}$-perfluoroalkoxy.

4. The method of claim 1, wherein said compound having the Formula 3:

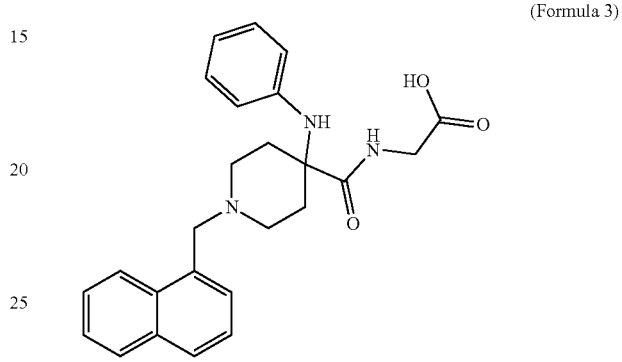

(Formula 3)

including any enantiomer, diastereomer, salt, or mixture thereof.

5. The method of claim 1, wherein said IBD is selected from the group consisting of: chronic esocolitis, Chron's disease, and chronic ulcerative colitis (UC).

6. The method of claim 1, wherein said pharmaceutical composition further comprises a pharmaceutically acceptable excipient.

7. The method of claim 1, wherein said pharmaceutical composition is administered orally or parenterally.

* * * * *